US012258880B1

(12) United States Patent
Sippel et al.

(10) Patent No.: US 12,258,880 B1
(45) Date of Patent: Mar. 25, 2025

(54) TURBINE SHROUD ASSEMBLIES WITH INTER-SEGMENT STRIP SEAL

(71) Applicant: Rolls-Royce Corporation, Indianapolis, IN (US)

(72) Inventors: Aaron D. Sippel, Indianapolis, IN (US); Ted J. Freeman, Indianapolis, IN (US); David J. Thomas, Indianapolis, IN (US); Clark J. Snyder, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 18/678,880

(22) Filed: May 30, 2024

(51) Int. Cl.
*F01D 11/08* (2006.01)
*F01D 11/00* (2006.01)
*F01D 25/24* (2006.01)

(52) U.S. Cl.
CPC .......... *F01D 25/246* (2013.01); *F01D 11/003* (2013.01); *F05D 2230/60* (2013.01); *F05D 2240/11* (2013.01)

(58) Field of Classification Search
CPC .... F01D 11/008; F01D 11/005; F01D 25/246; F01D 11/08; F05D 2220/32; F05D 2240/55; F05D 2240/11
See application file for complete search history.

(56) References Cited

U.S. PATENT DOCUMENTS 7,207,771 B2 4/2007 Synnott et al.
7,217,089 B2 5/2007 Durocher et al.
7,374,395 B2 5/2008 Durocher et al.
7,513,740 B1 4/2009 Hervy et al.
7,600,967 B2 10/2009 Pezzetti, Jr. et al.
7,771,159 B2 8/2010 Johnson et al.
7,901,186 B2 3/2011 Cornett et al.
8,206,087 B2 6/2012 Campbell et al.
8,303,245 B2 11/2012 Foster et al.
8,641,371 B2 2/2014 Nakamura et al.
8,651,497 B2 2/2014 Tholen et al.
8,684,680 B2 4/2014 Martin et al.
8,784,041 B2 7/2014 Durocher et al.
8,845,285 B2 9/2014 Weber et al.
8,905,708 B2 12/2014 Weber et al.
(Continued)

FOREIGN PATENT DOCUMENTS

EP 1965031 A2 9/2008
EP 3543468 A1 9/2019
FR 3056636 A1 3/2018

*Primary Examiner* — David E Sosnowski
*Assistant Examiner* — Maxime M Adjagbe
(74) *Attorney, Agent, or Firm* — Barnes & Thornburg LLP

(57) ABSTRACT

A turbine shroud assembly comprising a first shroud segment, a second shroud segment, and a plurality of seals. The first shroud segment includes a first carrier segment and a first blade track segment having a first shroud wall that is formed to include a first recess that extends circumferentially into the first shroud wall. The second shroud segment includes a second carrier segment and a second blade track having a second shroud wall that is formed to include a second recess that extends circumferentially into the second shroud wall. The plurality of seals extend circumferentially into the first shroud segment and the second shroud segment to block gases from escaping the gas path radially between the first shroud segment and the second shroud segment.

20 Claims, 11 Drawing Sheets

(56) References Cited

U.S. PATENT DOCUMENTS

| | | | |
|---|---|---|---|
| 9,079,245 | B2 | 7/2015 | Durocher et al. |
| 9,534,500 | B2 | 1/2017 | Bouchard et al. |
| 9,708,922 | B1 | 7/2017 | Davis et al. |
| 9,714,580 | B2 | 7/2017 | Slavens et al. |
| 9,745,854 | B2 | 8/2017 | Baldiga et al. |
| 9,759,079 | B2 | 9/2017 | Sippel et al. |
| 9,863,265 | B2 | 1/2018 | Stapleton |
| 9,863,323 | B2 | 1/2018 | Kirtley et al. |
| 9,869,201 | B2 | 1/2018 | Dyson et al. |
| 9,874,104 | B2 | 1/2018 | Shapiro |
| 9,915,162 | B2 | 3/2018 | Duguay |
| 9,945,484 | B2 | 4/2018 | Moehrle et al. |
| 9,957,827 | B2 | 5/2018 | Davis et al. |
| 9,982,550 | B2 | 5/2018 | Davis |
| 9,988,919 | B2 | 6/2018 | Davis et al. |
| 9,988,923 | B2 | 6/2018 | Snyder et al. |
| 10,012,099 | B2 | 7/2018 | Cetel et al. |
| 10,024,193 | B2 | 7/2018 | Shapiro |
| 10,072,517 | B2 | 9/2018 | Boeke et al. |
| 10,082,085 | B2 | 9/2018 | Thomas et al. |
| 10,087,771 | B2 | 10/2018 | Mcgarrah |
| 10,100,660 | B2 | 10/2018 | Sippel et al. |
| 10,132,197 | B2 | 11/2018 | Heitman et al. |
| 10,138,747 | B2 | 11/2018 | Dev et al. |
| 10,138,750 | B2 | 11/2018 | Mccaffrey et al. |
| 10,167,957 | B2 | 1/2019 | Davis et al. |
| 10,202,863 | B2 | 2/2019 | Davis et al. |
| 10,265,806 | B2 | 4/2019 | Cui et al. |
| 10,281,045 | B2 | 5/2019 | Sippel et al. |
| 10,301,955 | B2 | 5/2019 | Vetters et al. |
| 10,301,960 | B2 | 5/2019 | Stapleton et al. |
| 10,378,385 | B2 | 8/2019 | Tesson et al. |
| 10,378,386 | B2 | 8/2019 | Roussille et al. |
| 10,415,426 | B2 | 9/2019 | Quennehen et al. |
| 10,415,427 | B2 | 9/2019 | Quennehen et al. |
| 10,422,241 | B2 | 9/2019 | Mccaffrey et al. |
| 10,428,688 | B2 | 10/2019 | Quennehen et al. |
| 10,428,953 | B2 | 10/2019 | Lutjen et al. |
| 10,443,419 | B2 | 10/2019 | Thomas et al. |
| 10,443,420 | B2 * | 10/2019 | Sippel .................... F16J 15/062 |
| 10,465,545 | B2 | 11/2019 | Cetel et al. |
| 10,533,446 | B2 | 1/2020 | Barak et al. |
| 10,550,706 | B2 | 2/2020 | Lutjen et al. |
| 10,577,963 | B2 | 3/2020 | Mccaffrey |
| 10,577,977 | B2 | 3/2020 | Baucco |
| 10,584,605 | B2 | 3/2020 | Sippel et al. |
| 10,590,803 | B2 | 3/2020 | Quennehen et al. |
| 10,598,045 | B2 | 3/2020 | Tableau et al. |
| 10,605,120 | B2 | 3/2020 | Quennehen et al. |
| 10,619,517 | B2 | 4/2020 | Quennehen et al. |
| 10,626,745 | B2 | 4/2020 | Roussille et al. |
| 10,633,994 | B2 | 4/2020 | Barker |
| 10,648,362 | B2 | 5/2020 | Groves, II et al. |
| 10,655,495 | B2 | 5/2020 | Groves, II et al. |
| 10,655,501 | B2 | 5/2020 | Lepretre et al. |
| 10,662,794 | B2 | 5/2020 | Das |
| 10,689,998 | B2 | 6/2020 | Stapleton et al. |
| 10,690,007 | B2 | 6/2020 | Quennehen et al. |
| 10,704,404 | B2 | 7/2020 | Shi et al. |
| 10,718,226 | B2 | 7/2020 | Vetters et al. |
| 10,724,399 | B2 | 7/2020 | Carlin et al. |
| 10,731,494 | B2 | 8/2020 | Dev et al. |
| 10,731,509 | B2 | 8/2020 | Correia et al. |
| 10,738,643 | B2 | 8/2020 | Mccaffrey et al. |
| 10,753,221 | B2 | 8/2020 | Barker et al. |
| 10,787,924 | B2 | 9/2020 | Quennehen et al. |
| 10,794,204 | B2 | 10/2020 | Fitzpatrick et al. |
| 10,801,345 | B2 | 10/2020 | Clum et al. |
| 10,801,349 | B2 | 10/2020 | Mccaffrey |
| 10,815,807 | B2 | 10/2020 | Vantassel et al. |
| 10,815,810 | B2 | 10/2020 | Barker et al. |
| 10,830,357 | B2 | 11/2020 | Mccaffrey et al. |
| 10,890,079 | B2 | 1/2021 | Propheter-Hinckley et al. |
| 10,907,487 | B2 | 2/2021 | Zurmehly et al. |
| 10,907,501 | B2 | 2/2021 | Filippi et al. |
| 10,934,872 | B2 | 3/2021 | Tableau et al. |
| 10,934,873 | B2 | 3/2021 | Sarawate et al. |
| 10,968,761 | B2 | 4/2021 | Barker et al. |
| 10,968,777 | B2 | 4/2021 | Propheter-Hinckley et al. |
| 10,982,559 | B2 | 4/2021 | Filippi |
| 11,002,144 | B2 | 5/2021 | Azad et al. |
| 11,015,613 | B2 | 5/2021 | Kerns et al. |
| 11,021,988 | B2 | 6/2021 | Tableau et al. |
| 11,021,990 | B2 | 6/2021 | Filippi |
| 11,028,720 | B2 | 6/2021 | Tableau et al. |
| 11,041,399 | B2 | 6/2021 | Lutjen et al. |
| 11,047,245 | B2 | 6/2021 | Mccaffrey |
| 11,066,947 | B2 | 7/2021 | Sippel et al. |
| 11,073,045 | B2 | 7/2021 | Sippel et al. |
| 11,078,804 | B2 | 8/2021 | Tableau et al. |
| 11,085,316 | B2 | 8/2021 | Barker et al. |
| 11,085,317 | B2 | 8/2021 | Johnson et al. |
| 11,105,215 | B2 | 8/2021 | Roy Thill et al. |
| 11,111,794 | B2 | 9/2021 | Bitzko et al. |
| 11,111,802 | B2 | 9/2021 | Propheter-Hinckley et al. |
| 11,111,822 | B2 | 9/2021 | Tableau et al. |
| 11,111,823 | B2 | 9/2021 | Jarrossay et al. |
| 11,125,096 | B2 | 9/2021 | Clark et al. |
| 11,125,098 | B2 | 9/2021 | Barker et al. |
| 11,143,050 | B2 | 10/2021 | Roy Thill et al. |
| 11,149,574 | B2 | 10/2021 | Laroche |
| 11,174,747 | B2 | 11/2021 | Roy Thill et al. |
| 11,174,795 | B2 | 11/2021 | Lutjen et al. |
| 11,181,006 | B2 | 11/2021 | Smoke et al. |
| 11,187,094 | B2 | 11/2021 | Feldmann et al. |
| 11,215,064 | B2 | 1/2022 | Arbona et al. |
| 11,215,065 | B2 | 1/2022 | Starr et al. |
| 11,215,081 | B2 | 1/2022 | Schilling et al. |
| 11,248,480 | B2 | 2/2022 | Thirumalai et al. |
| 11,255,208 | B2 | 2/2022 | Clark et al. |
| 11,255,209 | B2 | 2/2022 | Clark et al. |
| 11,286,812 | B1 | 3/2022 | Freeman et al. |
| 11,313,242 | B2 | 4/2022 | Cetel et al. |
| 11,319,827 | B2 | 5/2022 | Clark et al. |
| 11,319,828 | B1 | 5/2022 | Freeman et al. |
| 11,326,463 | B2 | 5/2022 | Blaney et al. |
| 11,326,470 | B2 | 5/2022 | Dyson et al. |
| 11,346,237 | B1 * | 5/2022 | Freeman ............... F01D 25/246 |
| 11,346,251 | B1 | 5/2022 | Freeman et al. |
| 11,365,635 | B2 | 6/2022 | Read et al. |
| 11,441,434 | B2 | 9/2022 | Danis et al. |
| 11,441,441 | B1 | 9/2022 | Freeman et al. |
| 11,466,585 | B2 | 10/2022 | Arbona et al. |
| 11,466,586 | B2 | 10/2022 | Sippel et al. |
| 11,499,444 | B1 | 11/2022 | Freeman et al. |
| 11,506,085 | B2 | 11/2022 | Jarrossay et al. |
| 11,542,825 | B2 | 1/2023 | Hauswirth et al. |
| 11,542,827 | B2 | 1/2023 | Quennehen et al. |
| 11,624,291 | B2 | 4/2023 | Roy Thill et al. |
| 11,624,292 | B2 | 4/2023 | Clark et al. |
| 11,629,607 | B2 | 4/2023 | Freeman et al. |
| 11,643,939 | B2 | 5/2023 | Stoyanov et al. |
| 11,702,948 | B2 | 7/2023 | Hock et al. |
| 11,702,949 | B2 | 7/2023 | Freeman et al. |
| 11,713,694 | B1 | 8/2023 | Freeman et al. |
| 11,732,604 | B1 | 8/2023 | Freeman et al. |
| 11,761,351 | B2 | 9/2023 | Freeman et al. |
| 11,773,751 | B1 | 10/2023 | Freeman et al. |
| 11,781,440 | B2 | 10/2023 | Vincent et al. |
| 11,781,448 | B1 | 10/2023 | Holleran |
| 11,840,930 | B2 | 12/2023 | Propheter-Hinckley et al. |
| 11,840,936 | B1 | 12/2023 | Freeman et al. |
| 11,879,349 | B2 | 1/2024 | Schilling et al. |
| 2019/0153886 | A1 * | 5/2019 | Vetters .................. F01D 25/005 |
| 2021/0108532 | A1 * | 4/2021 | Freeman ............... F01D 25/246 |
| 2023/0184124 | A1 | 6/2023 | Stoyanov et al. |
| 2023/0332506 | A1 | 10/2023 | Freeman et al. |
| 2024/0003267 | A1 | 1/2024 | Cazin et al. |

* cited by examiner

TURBINE SHROUD ASSEMBLIES WITH INTER-SEGMENT STRIP SEAL

FIELD OF THE DISCLOSURE

The present disclosure relates generally to turbine shroud assemblies, and more specifically to sealing of turbine shroud assemblies used with gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Compressors and turbines typically include alternating stages of static vane assemblies and rotating wheel assemblies. The rotating wheel assemblies include disks carrying blades around their outer edges. When the rotating wheel assemblies turn, tips of the blades move along blade tracks included in static shrouds that are arranged around the rotating wheel assemblies. Such static shrouds may be coupled to an engine case that surrounds the compressor, the combustor, and the turbine.

Some shrouds are made up of a number of segments arranged circumferentially adjacent to one another to form a ring. Such shrouds may include sealing elements between segments to block air from leaking through the segments during operation of the gas turbine engine.

SUMMARY

The present disclosure may comprise one or more of the following features and combinations thereof.

A turbine shroud assembly for use with a gas turbine engine may comprise a first shroud segment, a second shroud segment, and a plurality of seals. The first shroud segment may include a first carrier segment arranged circumferentially at least partway around a central axis and a first blade track segment supported by the first carrier segment to define a first portion of a gas path of the turbine shroud assembly. The first blade track segment may have a first shroud wall, a first attachment flange, and a second attachment flange. The first shroud wall may extend circumferentially partway around the central axis. The first attachment flange may extend radially outward from the first shroud wall. The second attachment flange may extend radially outward from the first shroud wall axially spaced apart from the first attachment flange. The first shroud wall may have a first radial outer surface and a first radial inner surface. The first radial outer surface may include a first portion and a second portion that extends circumferentially away from the first portion and is spaced radially outward from the first portion. The first shroud wall may be formed to include a first recess that extends circumferentially into the first shroud wall.

In some embodiments, the second shroud segment may be arranged circumferentially adjacent the first shroud segment about the central axis. The second shroud segment may include a second carrier segment arranged circumferentially at least partway around the central axis and a second blade track segment supported by the second carrier segment to define a second portion of the gas path of the turbine shroud assembly. The second blade track segment may have a second shroud wall, a first attachment flange, and a second attachment flange. The second shroud wall may extend circumferentially partway around the central axis. The first attachment flange may extend radially outward from the second shroud wall. The second attachment flange may extend radially outward from the second shroud wall axially spaced apart from the first attachment flange of the second blade track segment. The second shroud wall may have a second radial outer surface and a second radial inner surface. The second radial outer surface may include a first portion and a second portion that extends circumferentially away from the first portion of the second radial outer surface and is spaced radially outward from the first portion of the second radial outer surface. The second shroud wall may be formed to include a second recess that extends circumferentially into the second shroud wall.

In some embodiments, the plurality of seals may extend circumferentially into the first shroud segment and the second shroud segment to block gases from escaping the gas path radially between the first shroud segment and the second shroud segment. The plurality of seals may include a first strip seal and a second strip seal. The first strip seal may extend axially along the first portion of the first radial outer surface of the first shroud wall and the first portion of the second radial outer surface of the second shroud wall to block the gases from passing radially between and beyond the first shroud wall and the second shroud wall. The second strip seal may be located radially inward of the first strip seal and may extend circumferentially into the first recess formed in the first shroud wall of the first blade track segment and the second recess formed in the second shroud wall of the second blade track segment to provide a heat shield for the first strip seal to protect the first strip seal from heat of the gases in the gas path. The second strip seal may include an axial segment that extends axially between a first end and a second end thereof opposite the first end and an aft radial segment coupled with the second end of the axial segment and extending axially aft and radially outward from the second end of the axial segment toward the first strip seal.

In some embodiments, the first end of the axial segment may terminate in an axial direction to cause the aft radial segment and the axial segment to cooperate with the first strip seal to define a cavity radially between the first strip seal and the axial segment of the second strip seal. The cavity may have an open axial forward end and an at least partially closed axial aft end defined by the aft radial segment. The second strip seal may include a forward radial segment coupled with the first end of the axial segment and extending axially forward and radially outward from the first end of the axial segment toward the first strip seal.

In some embodiments, the first recess of the first shroud wall may include a first radially-extending portion that extends radially inward and axially aft, an axially-extending portion that extends axially aft from the first radially-extending portion, and a second radially-extending portion that extends radially outward and axially aft from the axially-extending portion. The first radially-extending portion may extend radially inward from the first portion of the first radial outer surface of the first shroud wall. The second radially-extending portion may extend radially outward to the first portion of the first radial outer surface of the first shroud wall. The axially-extending portion may be radially spaced apart from the first portion of the first radial outer surface of the first shroud wall.

In some embodiments, the first carrier segment may include a first outer wall, a first flange, a second flange, a third flange, and a fourth flange. The first flange may extend radially inward from the first outer wall. The second flange may be axially spaced apart from the first flange and may extend radially inward from the first outer wall. The third flange may extend radially inward from the first outer wall and may be located axially between the first flange and the second flange. The fourth flange may extend radially inward from the first outer wall and may be located axially between the third flange and the second flange. The first strip seal may include a body segment, a forward segment, and an aft segment. The body segment may extend axially along the first portion of the first radial outer surface of the first shroud wall and the first portion of the second radial outer surface of the second shroud wall. The forward segment may be coupled to a first end of the body segment and may extend axially forward and radially outward from the first end of the body segment into the first flange of the first carrier segment. The aft segment may be coupled to a second end of the body segment opposite the first end thereof and may extend axially aft and radially outward from the second end of the body segment. The aft segment may be located axially aft of the second flange of the first carrier segment.

In some embodiments, the plurality of seals may include a damping segment that extends along a curvilinear path and is located radially outward of the first strip seal and axially between the first flange and the second flange of the first carrier segment. The damping segment may be formed to include a first radially-extending portion at a forward end of the damping segment that extends into the third flange of the first carrier segment and a second radially-extending portion at an aft end of the damping segment that extends into the fourth flange of the first carrier segment. The damping segment may be w-shaped and may include a curved intermediate portion that extends between and interconnects the first radially-extending portion and the second radially-extending portion. The curved intermediate portion may engage the first strip seal to urge the first strip seal radially inwardly against the first portion of the first radial outer surface of the first shroud wall and the first portion of the second radial outer surface of the second shroud wall.

In some embodiments, the first strip seal may be formed to include at least one hole extending radially through the first strip seal to direct cooling air radially inwardly through the at least one hole toward the second strip seal to cool the second strip seal.

According to another aspect of the present disclosure, a turbine shroud assembly for use with a gas turbine engine may comprise a first shroud segment, a second shroud segment, and a plurality of seals. The first shroud segment may include a first carrier segment arranged circumferentially at least partway around a central axis and a first blade track segment supported by the first carrier segment to define a first portion of a gas path of the turbine shroud assembly. The first blade track segment may have a first shroud wall that extends circumferentially partway around the central axis and a first attachment feature that extends radially outward from the first shroud wall. The first shroud wall may define a first radial outer surface. The second shroud segment may be arranged circumferentially adjacent the first shroud segment about the central axis. The second shroud segment may include a second carrier segment arranged circumferentially at least partway around the central axis and a second blade track segment supported by the second carrier segment to define a second portion of the gas path of the turbine shroud assembly. The second blade track segment may have a second shroud wall that extends circumferentially partway around the central axis and a second attachment feature that extends radially outward from the second shroud wall. The second shroud wall may define a second radial outer surface.

In some embodiments, the plurality of seals may extend circumferentially into the first shroud segment and the second shroud segment. The plurality of seals may include a first seal and a second seal. The first seal may extend axially along the first radial outer surface of the first shroud wall and the second radial outer surface of the second shroud wall. The second seal may be located radially inward of the first seal and may extend circumferentially into the first blade track segment and the second blade track segment. The second seal may include an axial segment and an aft radial segment. The axial segment may extend axially between a first end and a second end thereof opposite the first end. The aft radial segment may be coupled with the second end of the axial segment and may extend axially aft and radially outward from the second end of the axial segment toward the first seal.

In some embodiments, the first end of the axial segment may terminate in an axial direction to cause the aft radial segment and the axial segment to cooperate with the first seal to define a cavity radially between the first seal and the axial segment of the second seal. The cavity may have an open axial forward end and an at least partially closed axial aft end defined by the aft radial segment. The second seal may include a forward radial segment coupled with the first end of the axial segment and extending axially forward and radially outward from the first end of the axial segment toward the first seal.

In some embodiments, the first shroud wall may be formed to include a first recess that extends circumferentially into the first shroud wall and the second shroud wall may be formed to include a second recess that extends circumferentially into the second shroud wall. The second seal may extend circumferentially into each of the first recess and the second recess to extend therebetween. The first recess of the first shroud wall may include an axially-extending portion that extends axially aft and a radially-extending portion that extends radially outward and axially aft from the axially-extending portion.

In some embodiments, the first carrier segment may include a first outer wall, a first flange, a second flange, a third flange, and a fourth flange. The first flange may extend radially inward from the first outer wall. The second flange may be axially spaced apart from the first flange and may extend radially inward from the first outer wall. The third flange may extend radially inward from the first outer wall and may be located axially between the first flange and the second flange. The fourth flange may extend radially inward from the first outer wall and may be located axially between the third flange and the second flange. The first seal may include a body segment, a forward segment, and an aft segment. The body segment may extend axially along the first radial outer surface of the first shroud wall and the second radial outer surface of the second shroud wall. The forward segment may be coupled to a first end of the body segment and may extend axially forward and radially outward from the first end of the body segment into the first flange of the first carrier segment. The aft segment may be coupled to a second end of the body segment opposite the first end thereof and may extend axially aft and radially outward from the second end of the body segment. The aft segment may be located axially aft of the second flange of the first carrier segment.

In some embodiments, the plurality of seals may include a damping segment that extends along a curvilinear path. The damping segment may be located radially outward of the first seal. The damping segment may be formed to include a first radially-extending portion at a forward end of the damping segment that extends into the third flange of the first carrier segment, a second radially-extending portion at an aft end of the damping segment that extends into the fourth flange of the first carrier segment, and a curved intermediate portion that extends between and interconnects the first radially-extending portion and the second radially-extending portion. The curved intermediate portion may engage the first seal to urge the first seal radially inwardly against the first radial outer surface of the first shroud wall and the second radial outer surface of the second shroud wall.

A method of assembling a turbine shroud assembly for use with a gas turbine engine may comprise assembling a first shroud segment by coupling a first blade track segment with a first carrier segment to support the first blade track segment radially inward of the first carrier segment. The method may comprise assembling a second shroud segment by coupling a second blade track segment with a second carrier segment to support the second blade track segment radially inward of the second carrier segment. The method may comprise locating a first seal on a first radial outer surface of the first blade track segment. The method may comprise locating a second seal in a first recess that extends circumferentially into the first blade track segment so that the second seal is located radially inwardly of the first seal. The method may comprise locating a damping segment on a radially outer surface of the first seal so that the damping segment engages the first seal and the first carrier segment.

In some embodiments, the first carrier segment may include a first outer wall, a first flange, a second flange, a third flange, and a fourth flange. The first flange may extend radially inward from the first outer wall. The second flange may be axially spaced apart from the first flange and extending radially inward from the first outer wall. The third flange may extend radially inward from the first outer wall and may be located axially between the first flange and the second flange. The fourth flange may extend radially inward from the first outer wall and may be located axially between the third flange and the second flange. The method may comprise locating a first portion of the damping segment in the third flange of the first carrier segment and a second portion of the damping segment in the fourth flange of the first carrier segment and urging the first seal radially inwardly against the first radial outer surface of the first blade track segment through engagement of the damping segment with the third flange and the fourth flange. The method may comprise directing cool air radially inwardly through at least one hole formed in the first seal toward the second seal to cool the second seal.

These and other features of the present disclosure will become more apparent from the following description of the illustrative embodiments.

DETAILED DESCRIPTION

Figure 1:
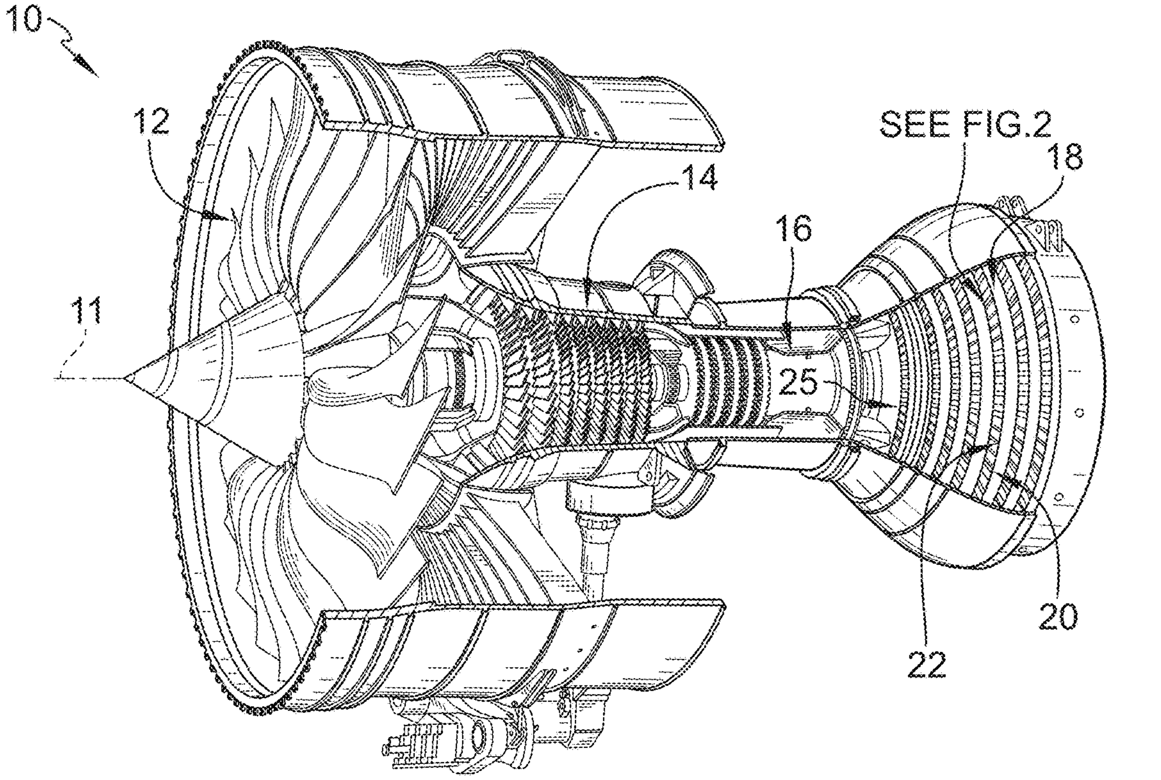
FIG. 1 is a cutaway perspective view of a gas turbine engine that includes a fan, a compressor, a combustor, and a turbine, the turbine including a turbine shroud assembly that extends circumferentially around an axis of the gas turbine engine and turbine wheel assemblies that are driven to rotate about the axis to generate power.

For the purposes of promoting an understanding of the principles of the disclosure, reference will now be made to a number of illustrative embodiments illustrated in the drawings and specific language will be used to describe the same.

An illustrative aerospace gas turbine engine 10 includes a fan 12, a compressor 14, a combustor 16, and a turbine 18 as shown in FIG. 1. The fan 12 is driven by the turbine 18 and provides thrust for propelling an air vehicle. The compressor 14 compresses and delivers air to the combustor 16. The combustor 16 mixes fuel with the compressed air received from the compressor 14 and ignites the fuel. The hot, high-pressure products of the combustion reaction in the combustor 16 are directed into the turbine 18 to cause the turbine 18 to rotate about a central axis 11 and drive the compressor 14 and the fan 12. In some embodiments, the fan 12 may be replaced with a propeller, drive shaft, or other suitable configuration.

Figure 2:
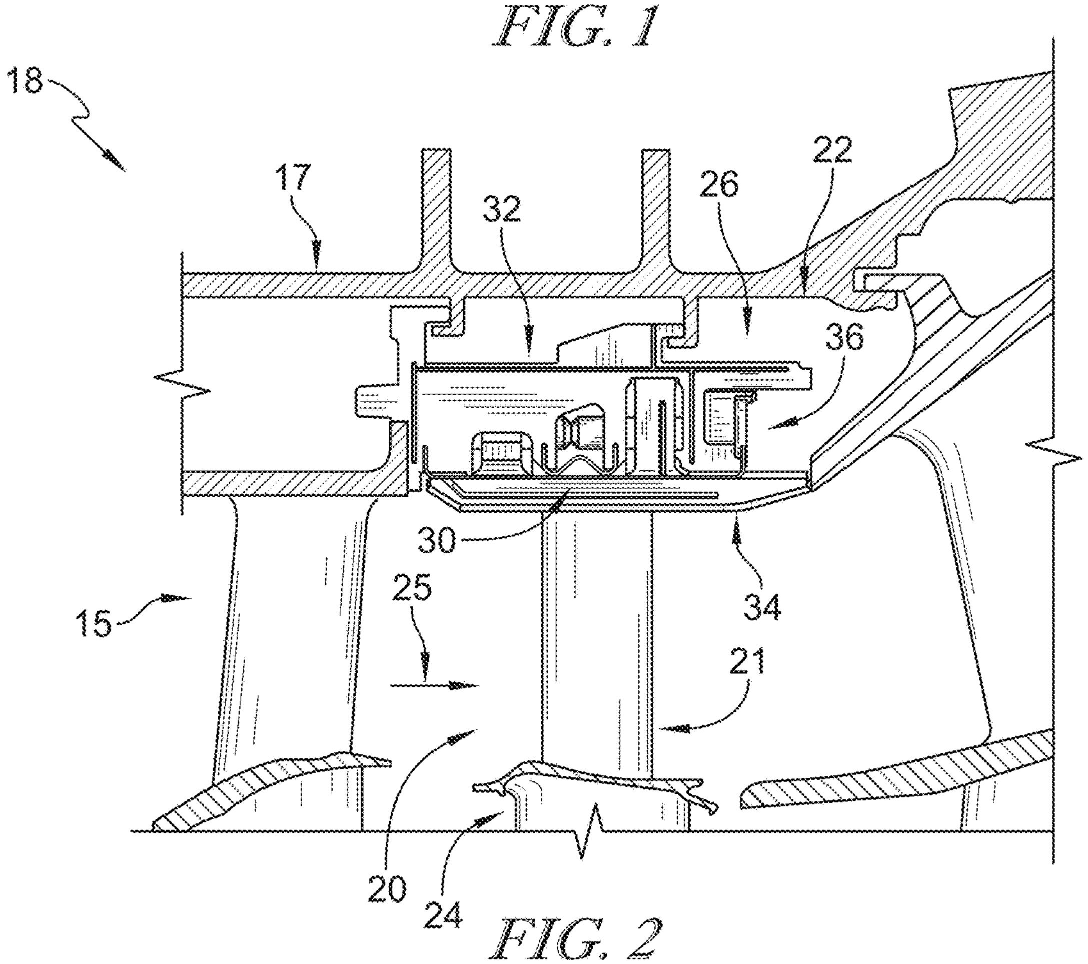
FIG. 2 is a cutaway perspective view of a portion of the turbine shroud assembly of FIG. 1 showing one of the turbine wheel assemblies and a first shroud segment of a plurality of shroud segments arranged around the turbine wheel assembly, the first shroud segment including a first carrier segment, a first blade track segment that defines a portion of a gas path of the turbine, and a first retainer that couples the first blade track segment with the first carrier segment, and further showing that a plurality of seals of the turbine shroud assembly extend circumferentially into the first shroud segment to block gases from passing between the first shroud segment and a circumferentially adjacent second shroud segment.

The turbine 18 includes at least one turbine wheel assembly 20 and a turbine shroud assembly 22 positioned to surround the turbine wheel assembly 20 as shown in FIGS. 1 and 2. The turbine wheel assembly 20 includes a plurality of blades 21 coupled to a rotor disk 24 for rotation with the rotor disk 24. The hot, high-pressure combustion products from the combustor 16 are directed toward the blades 21 of the turbine wheel assemblies 20 along a gas path 25. The turbine wheel assembly 20 further includes a plurality of vanes 15 as shown in FIG. 2. The turbine shroud assembly 22 is coupled to an outer case 17 of the gas turbine engine 10 and extends around the turbine wheel assembly 20 to block gases from passing over the blades 21 during use of the turbine 18 in the gas turbine engine 10.

Figure 4:
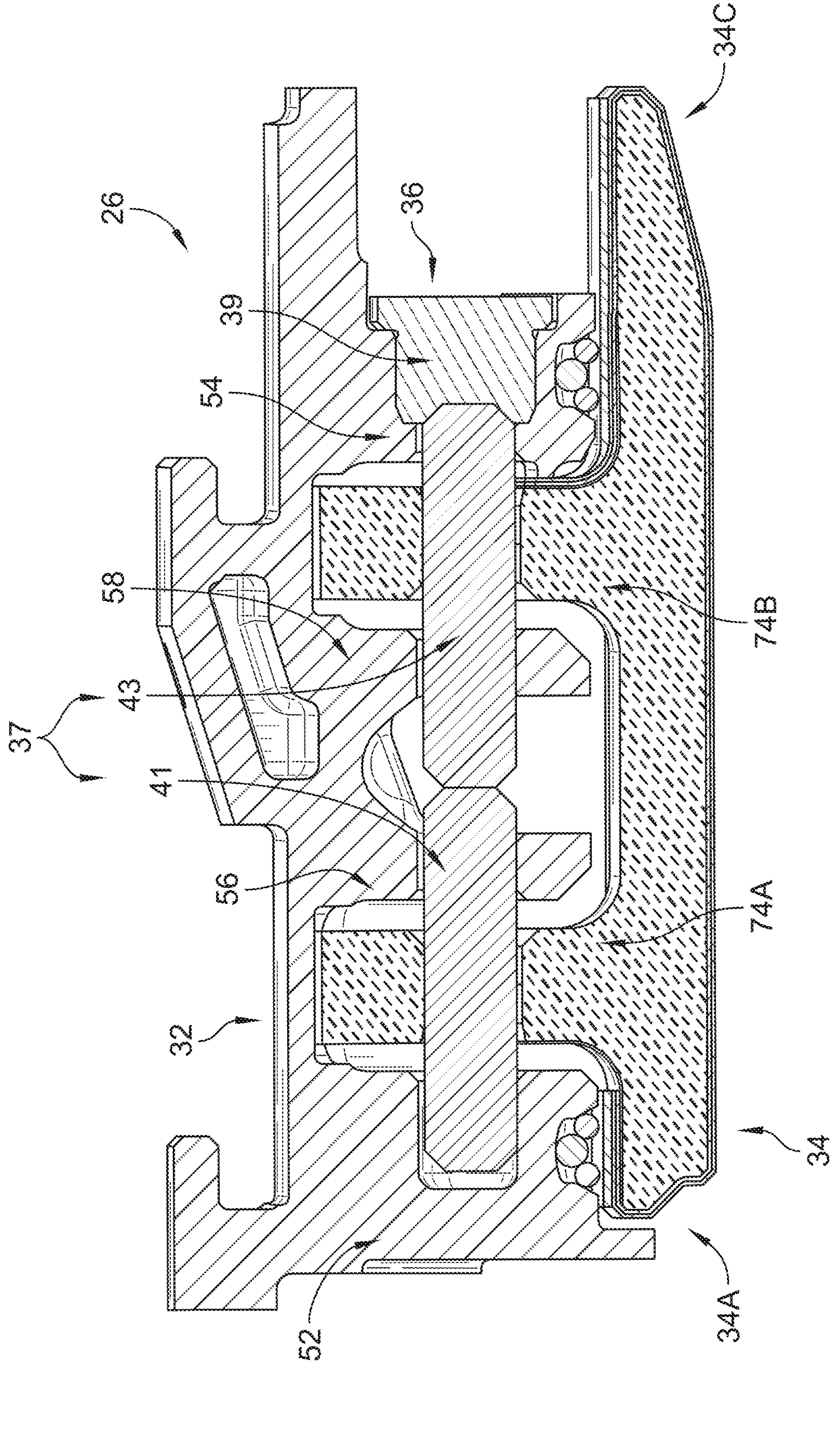
FIG. 4 is a cross-sectional view of the first shroud segment of FIG. 3 showing that the first retainer extends through the first blade track segment and through the first carrier segment to couple the first blade track segment to the first carrier segment.
Figure 5:
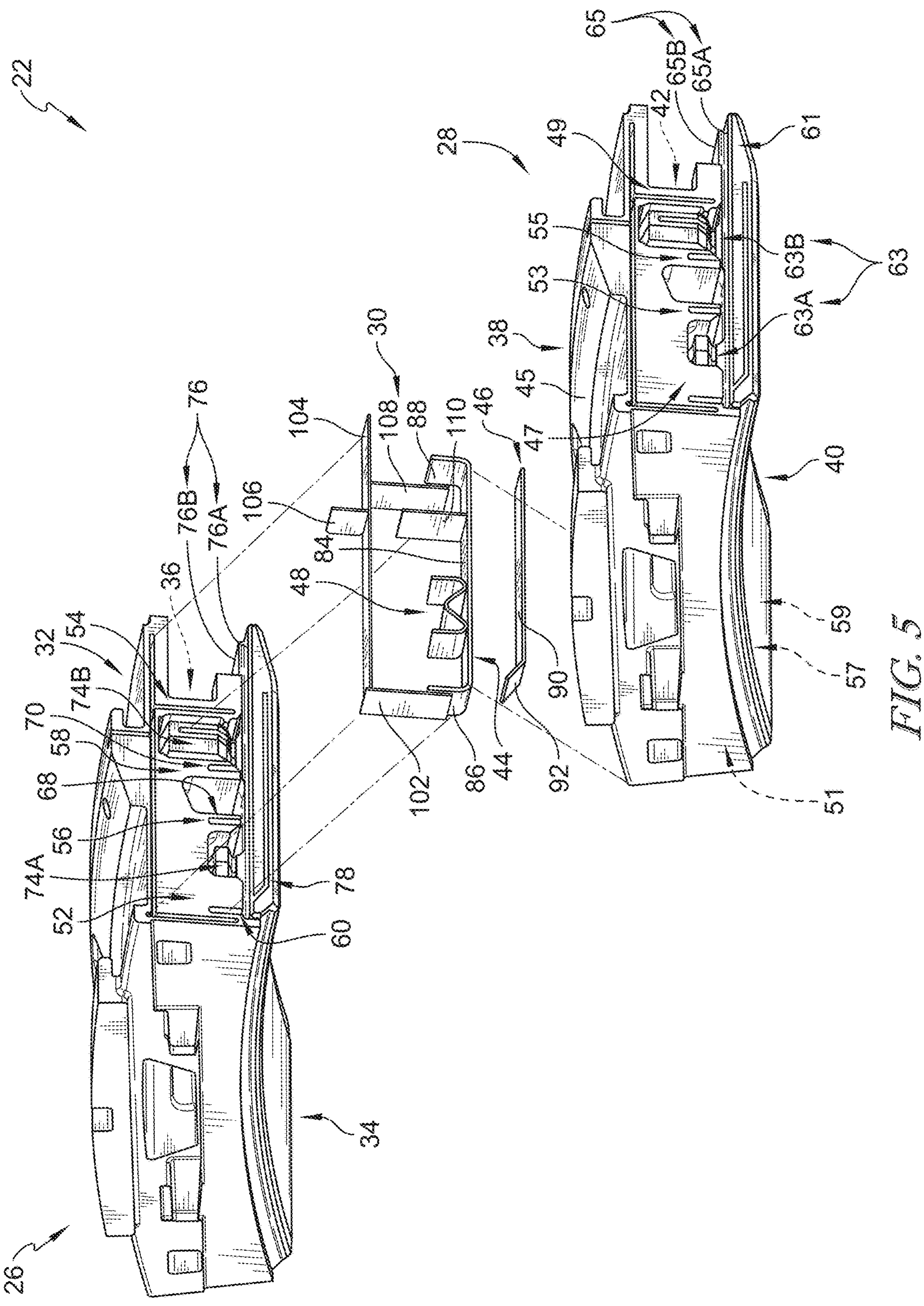
FIG. 5 is an exploded view of the first and second shroud segments used in the gas turbine engine of FIG. 1 showing the first shroud segment and the second shroud segment spaced apart from the first shroud segment, the second shroud segment including a second carrier segment and a second blade track segment supported by the second carrier segment, and further suggesting that the plurality of seals extends circumferentially into the first shroud segment and the second shroud segment to block gases from escaping the gas path radially between the first shroud segment and the second shroud segment, and further showing that the second strip seal includes an axial segment that extends axially between a first end and a second end thereof and a forward radial segment coupled with the first end of the axial segment to extend radially outward toward the first strip seal.

The turbine shroud assembly 22 includes a plurality of shroud segments and pluralities of seals between adjacent shroud segments as suggested in FIGS. 2 and 5. Of the plurality of shroud segments, a first shroud segment 26 and a second shroud segment 28 are discussed in detail below. Likewise, a plurality of seals 30 included in the pluralities of seals used in the turbine shroud assembly 22 is shown in FIGS. 2-5. The first shroud segment 26, the second shroud segment 28, and the plurality of seals 30 are representative of other adjacent shroud segments and pluralities of seals included in the turbine shroud assembly 22.

Figure 3:
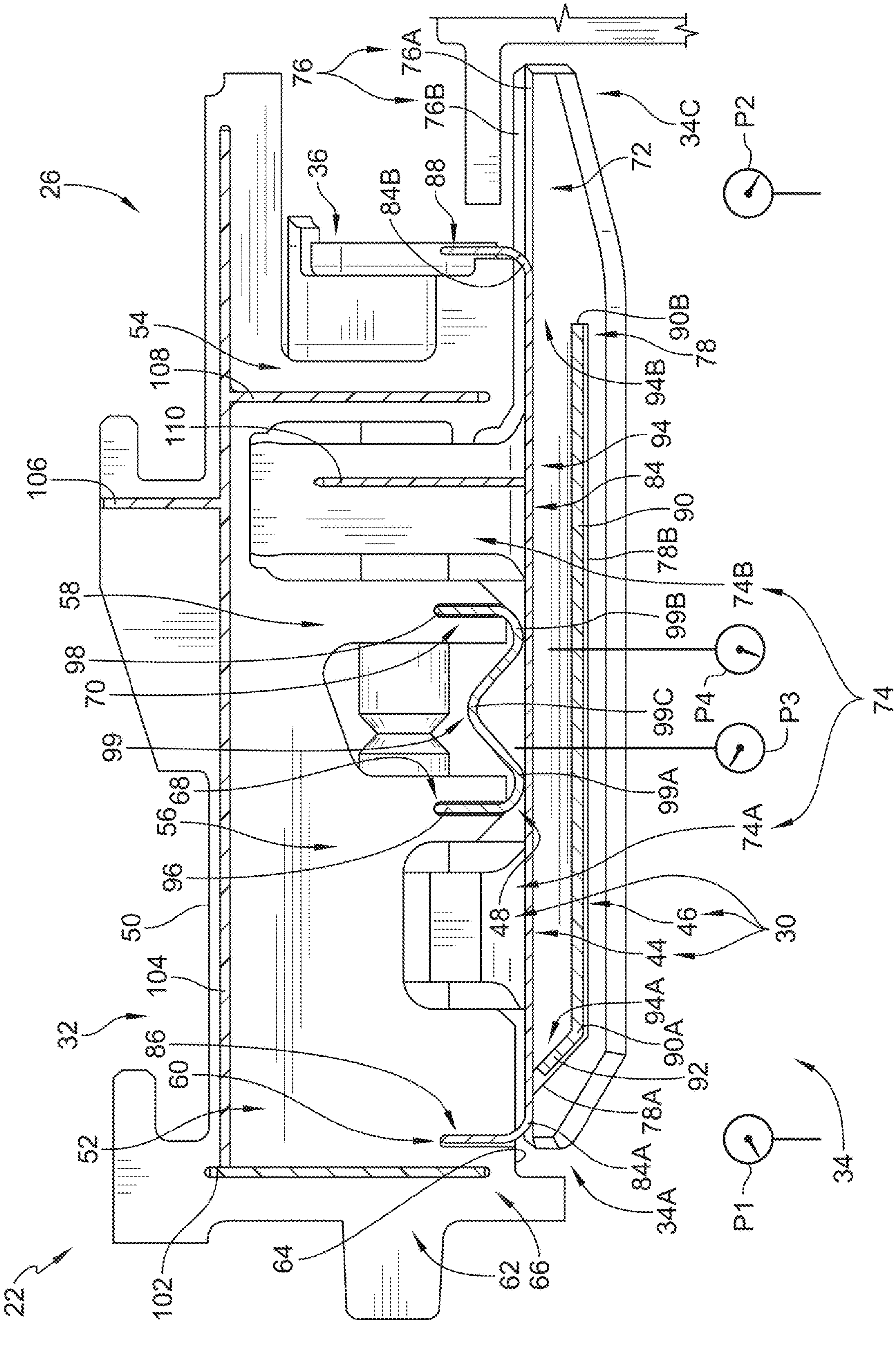
FIG. 3 is a cross-sectional view of the turbine shroud assembly through the plurality of seals of FIG. 2 showing that the first blade track segment includes a first shroud wall that defines a first radial outer surface and is formed to include a first recess that extends circumferentially into the first shroud wall and includes a first radially-extending portion that extends radially inward and axially aft from the first radial outer surface and an axially-extending portion that extends axially aft from the first radially-extending portion, and further showing that a first strip seal of the plurality of seals extends axially along the first radial outer surface of the first shroud wall, a second strip seal of the plurality of seals extends circumferentially into the first recess to provide a heat shield for the first strip seal to protect the first strip seal from heat of gases in the gas path, and a damping segment of the plurality of seals engages the first strip seal to urge the first strip seal radially inwardly.
Figure 8:
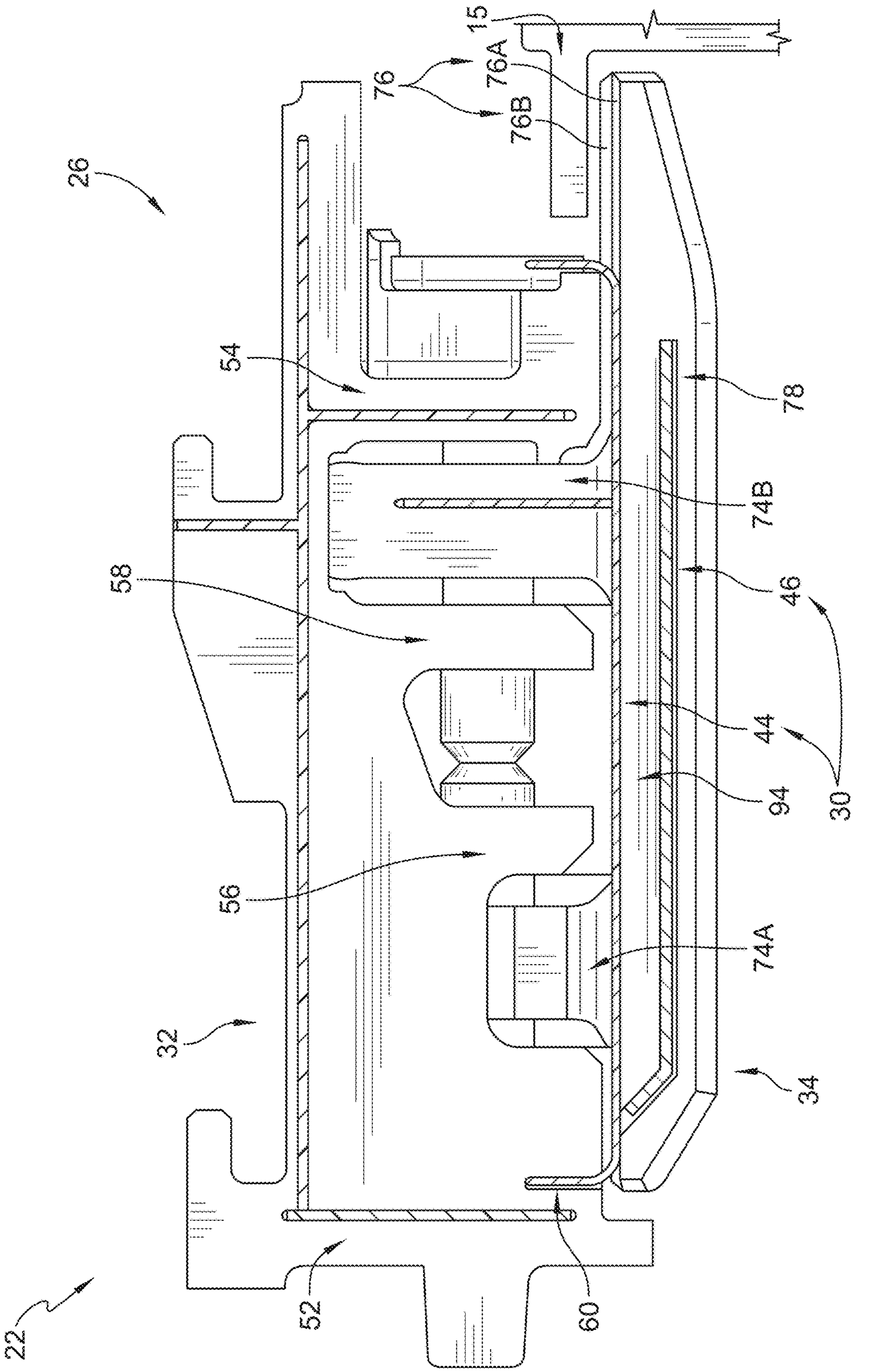
FIG. 8 is a cross-sectional view of the turbine shroud assembly through the plurality of seals of FIG. 3 showing that the plurality of seals includes the first strip seal and the second strip seal, and further showing that the damping segment is omitted in alternative embodiments.

The plurality of seals 30 in the illustrative embodiment includes a first strip seal 44, a second strip seal 46, and a damping segment 48 as shown in FIG. 3. The first strip seal 44 blocks gases from the gas path 25 from passing radially between the first shroud segment 26 and the second shroud segment 28. The second strip seal 46 provides a heat shield for the first strip seal 44 to protect the first strip seal 44 from heat of the gases in the gas path 25. The second strip seal 46 also reduces a pressure load applied to the first strip seal 44 from the gases in the gas path 25. The damping segment 48 urges the first strip seal 44 radially inward. In some embodiments, the damping segment 48 is omitted, as shown in FIG. 8. In some embodiments, the plurality of seals 30 includes strip seals 102, 104, 106, 108, 110 as shown in FIGS. 3 and 5. Any of the strip seals 102, 104, 106, 108, 110 may be included or omitted from the plurality of seals 30. The strip seals 102, 104, 106, 108, 110 are representative of more conventional strip seals.

Figure 6:
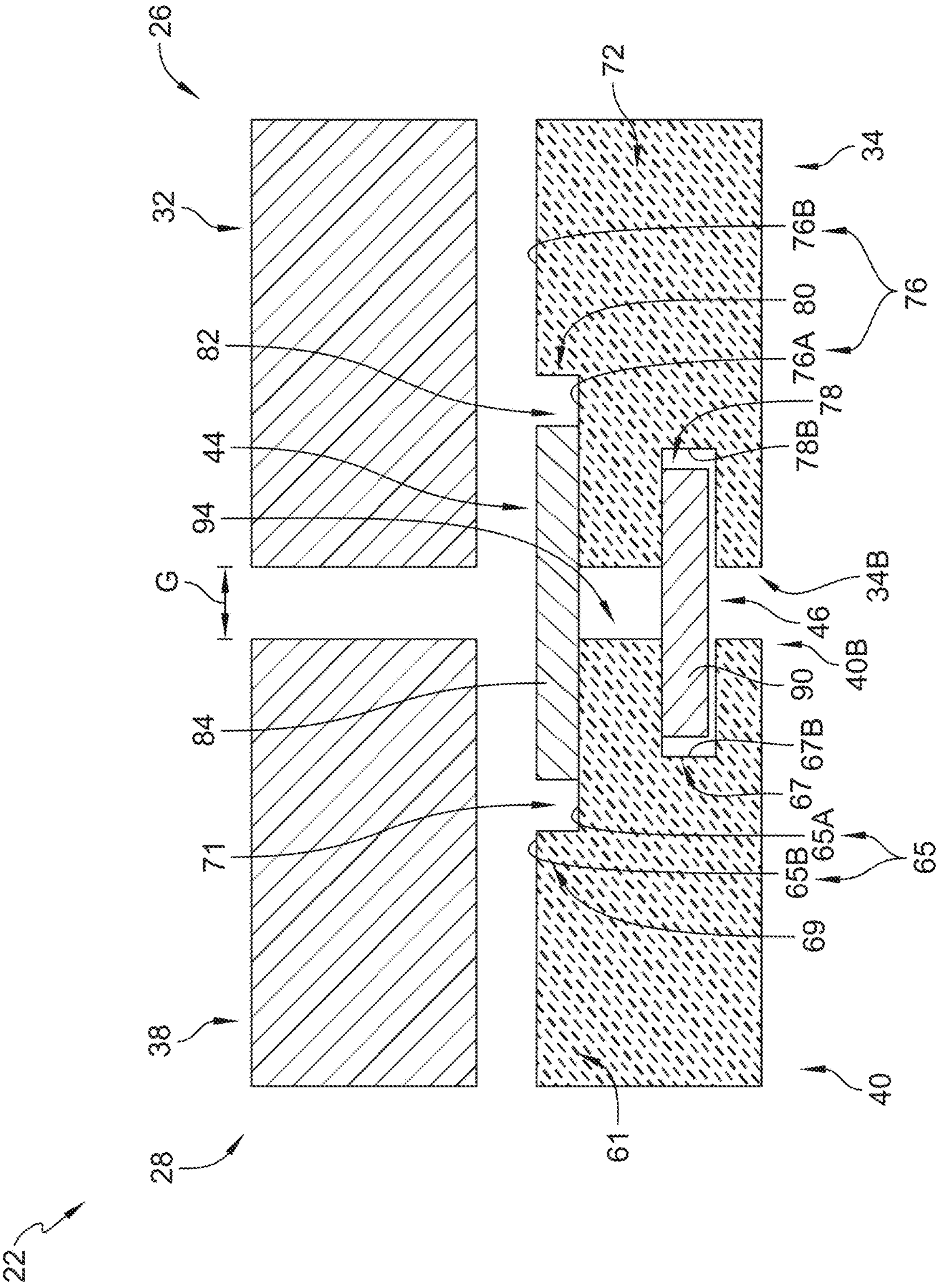
FIG. 6 is a cross-sectional diagrammatic view through the first and second shroud segments as assembled in the turbine shroud assembly of FIG. 1 showing that the first shroud segment and the second shroud segment are assembled adjacent one another and the first strip seal and the second strip seal each extend circumferentially between the first shroud segment and the second shroud segment, and further showing that the first radial outer surface of the first shroud wall includes a first portion and a second portion spaced radially outward from the first portion, the first strip seal extends along the first portion of the first radial outer surface of the first shroud wall and a first portion of a second radial outer surface of the second shroud wall and the axial segment of the second strip seal extends into the axially-extending portion of the first recess formed in the first shroud wall of the first blade track segment and into an axially-extending portion of a second recess formed in a second shroud wall of the second blade track segment to protect the first strip seal from heat of the gases in the gas path.

The second shroud segment 28 is arranged circumferentially adjacent the first shroud segment 26 about the central axis 11. A circumferential gap G is formed between the first shroud segment 26 and the second shroud segment 28 as shown in FIG. 6. Though the turbine shroud assembly 22 is shown and described as having two shroud segments 26, 28 and a plurality of seals 30, the turbine shroud assembly 22 includes additional shroud segments and additional seals so that the turbine shroud assembly 22 extends entirely circumferentially about the central axis 11 as suggested in FIG. 1.

The first shroud segment 26 includes a first carrier segment 32, a first blade track segment 34, and a first retainer 36 as shown in FIGS. 3 and 4. The first carrier segment 32 is arranged circumferentially at least partway around the central axis 11 and is coupled with the outer case 17 with hook features in the illustrative embodiment. The first blade track segment 34 is supported by the first carrier segment 32 to define a first portion of the gas path 25. The first retainer 36 extends axially through the first carrier segment 32 and the first blade track segment 34 to couple the first carrier segment 32 and the first blade track segment 34 together.

The second shroud segment 28 includes a second carrier segment 38, a second blade track segment 40, and a second retainer 42 as shown in FIG. 5. The second carrier segment 38 is arranged circumferentially at least partway around the central axis 11 and is coupled with the outer case 17 with hook features in the illustrative embodiment. The second blade track segment 40 is supported by the second carrier segment 38 to define a second portion of the gas path 25. The second retainer 42 extends axially through the second carrier segment 38 and the second blade track segment 40 to couple the second carrier segment 38 and the second blade track segment 40 together.

The plurality of seals 30 extends circumferentially into the first shroud segment 26 and the second shroud segment 28 as shown in FIG. 6 and as suggested in FIG. 5. The plurality of seals 30, along with the other strip seals 102, 104, 106, 108, 110, blocks gases in the gas path 25 from escaping the gas path 25 radially outward and circumferentially between the first shroud segment 26 and the second shroud segment 28 through the circumferential gap G.

Degradation and fluttering of strip seals may be a concern in turbine shroud assemblies. To minimize degradation of the first strip seal 44, the second strip seal 46 is located radially inward of the first strip seal 44 to protect the first strip seal 44 from heat of the gases in the gas path 25. Further, to minimize fluttering, and thus, reduce the possibility of failure of the first strip seal 44, the second strip seal 46 reduces a pressure load applied to the first strip seal 44 of the present disclosure from the gases in the gas path 25 so that the first strip seal 44 is urged radially inwardly against the blade track segments 34, 40 and any flutter or vibration is dampened.

Turning back to the first shroud segment 26, the first carrier segment 32 of the first shroud segment 26 includes a first outer wall 50, a first flange 52, and a second flange 54 as shown in FIG. 3. The first flange 52 extends radially inward from the first outer wall 50. The second flange 54 is axially spaced apart from the first flange 52 and extends radially inward from the first outer wall 50. The first flange 52 is formed to include a first slot 60 as shown in FIG. 3. The first slot 60 extends circumferentially into the first flange 52 and is shaped to receive a portion of the first strip seal 44 therein.

The first flange 52 of the first carrier segment 32 includes a first wall 62 formed to include a radially inward facing surface 64 as shown in FIG. 3. The first slot 60 extends axially forward and radially outward into the first flange 52 from the radially inward facing surface 64 to match the curvature of a portion of the first strip seal 44 that extends into the first slot 60. A first protrusion 66 extends radially inward from the first wall 62 axially forward of the first slot 60. The first protrusion 66 is located axially forward of the first blade track segment 34 to cover an axial forward end 34A of the first blade track segment 34. The first protrusion 66 blocks at least a portion of the gases flowing through the gas path 25 from flowing axially into the first strip seal 44.

The first carrier segment 32 further includes a third flange 56 and a fourth flange 58 as shown in FIG. 3. Each of the third flange 56 and the fourth flange 58 extends radially inward from the first outer wall 50. The third flange 56 is located axially between the first flange 52 and the fourth flange 58. The fourth flange 58 is located axially between the third flange 56 and the second flange 54.

The third flange 56 of the first carrier segment 32 is formed to include a second slot 68 as shown in FIG. 3. The second slot 68 extends radially outward into the third flange 56. The second slot 68 receives a portion of the damping segment 48 therein as shown in FIG. 3. The fourth flange 58 of the first carrier segment 32 is formed to include a third slot 70 as shown in FIG. 3. The third slot 70 extends radially outward into the fourth flange 58. The third slot 70 receives another portion of the damping segment 48 therein as shown in FIG. 3. Each of the flanges 52, 54, 56, and 58 of the first carrier segment 32 is formed to include a hole that receives the first retainer 36 therein as shown in FIGS. 3 and 4. Illustratively, the first carrier segment 32 is made of metallic materials.

The first blade track segment 34 includes a first shroud wall 72 and a first attachment feature 74 that extends radially outward from the first shroud wall 72 as shown in FIGS. 3 and 4. The first shroud wall 72 extends circumferentially partway around the central axis 11. The first shroud wall 72 has a first radial outer surface 76 that faces toward the first carrier segment 32 and a first radial inner surface opposite the first radial outer surface 76 that faces toward the gas path 25. Illustratively, the first attachment feature 74 includes a first attachment flange 74A and a second attachment flange 74B axially aft of the first attachment flange 74A. Each of the attachment flanges 74A, 74B is formed to include a hole that receives the first retainer 36 therein. The first attachment flange 74A is located axially between the first flange 52 and the third flange 56 as shown in FIG. 3. The second attachment flange 74B is located axially between the fourth flange 58 and the second flange 54. Illustratively, the first blade track segment 34 is made of ceramic matrix composite materials.

The first radial outer surface 76 of the first shroud wall 72 includes a first portion 76A and a second portion 76B as shown in FIGS. 5 and 6. The second portion 76B is spaced radially outward from the first portion 76A. The first portion 76A defines a circumferential end 34B of the first shroud wall 72 that confronts the second blade track segment 40 as shown in FIG. 6. The second portion 76B extends circumferentially away from the first portion 76A. The circumferential end 34B is formed with a first pocket 80 that defines the first portion 76A of the first radial outer surface 76 as shown in FIGS. 5 and 6. The first shroud wall 72 slopes radially inwardly at the circumferential end 34B to define the first portion 76A of the first radial outer surface 76. The first and second portions 76A, 76B of the first radial outer surface 76 are exposed to air located radially between the first carrier segment 32 and the first blade track segment 34.

The first strip seal 44 of the plurality of seals 30 is located on the first portion 76A of the first radial outer surface 76 as shown in FIG. 6.

Figure 7:
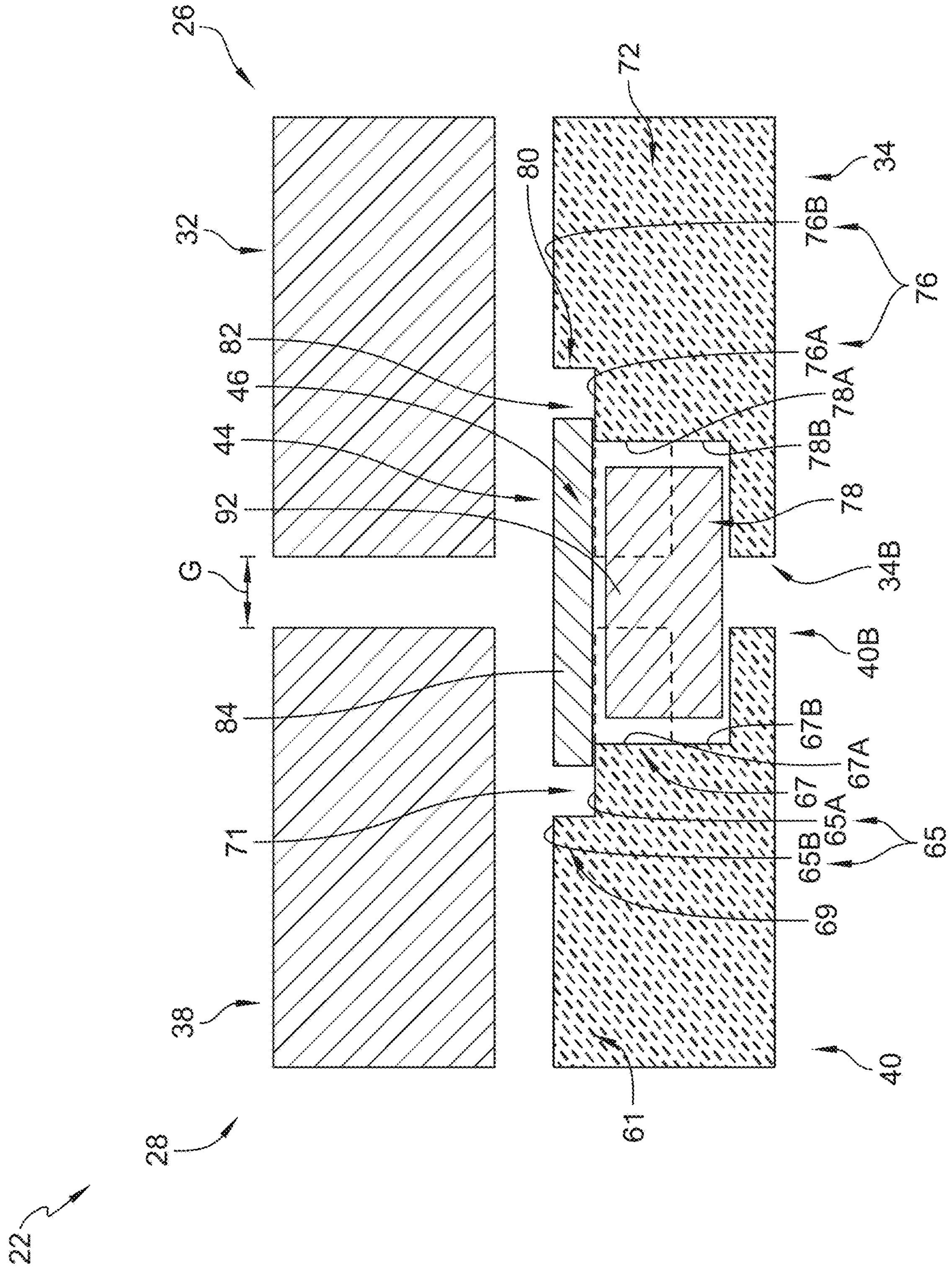
FIG. 7 is a cross-sectional diagrammatic view through the first and second shroud segments as assembled in the turbine shroud assembly of FIG. 1 showing that the first radially-extending portion of the first recess and a first radially-extending portion of the second recess extend radially outward to the first portion of the first radial outer surface of the first shroud wall and the first portion of the second radial outer surface of the second shroud wall, respectively, and further showing that the forward radial segment of the second strip seal extends radially outward at the first end of the axial segment of the second strip seal toward the first strip seal.

The circumferential end 34B of the first shroud wall 72 is formed to include a first recess 78 extending circumferentially into the first shroud wall 72 to receive the second strip seal 46 therein as shown in FIG. 6. The first recess 78 of the first shroud wall 72 includes a first radially-extending portion 78A that extends radially inward and axially aft and an axially-extending portion 78B that extends axially aft from the first radially-extending portion 78A as shown in FIG. 3. In some embodiments, the first radially-extending portion 78A extends radially inward from the first portion 76A of the first radial outer surface 76 of the first shroud wall 72 such that the first radially-extending portion 78A has an open end at the first portion 76A as shown in FIG. 7. The axially-extending portion 78B is radially spaced apart from the first portion 76A of the first radial outer surface 76 of the first shroud wall 72.

In the illustrative embodiment, the first retainer 36 includes a mount pin 37 and a mount plug 39 as shown in FIG. 4. The first retainer 36 couples the first blade track segment 34 to the first carrier segment 32 as shown in FIGS. 3 and 4. The mount pin 37 extends through the first blade track segment 34 and into the first carrier segment 32. The mount plug 39 fits into the first carrier segment 32 axially aft of the mount pin 37 and circumferentially aligned with the mount pin 37. In the illustrative embodiment, the mount pin 37 includes a forward pin 41 and an aft pin 43 as shown in FIG. 4. The forward pin 41 and the aft pin 43 of the mount pin 37 are circumferentially aligned with one another. In this embodiment, the forward pin 41 is separate from the aft pin 43 so as to allow for independent loading during use in the gas turbine engine 10. In some embodiments, the mount pin 37 is formed as a single pin. Though not shown, in the illustrative embodiment, an additional first retainer is included in the first shroud segment 26 spaced apart circumferentially from the first retainer 36 such that the first shroud segment 26 includes two forward pins 41, two aft pins 43, and two mount plugs 39.

The second carrier segment 38 of the second shroud segment 28 includes a second outer wall 45, a fifth flange 47, and a sixth flange 49 as shown in FIG. 5. The fifth flange 47 extends radially inward from the second outer wall 45. The sixth flange 49 is axially spaced apart from the fifth flange 47 and extends radially inward from the second outer wall 45. The fifth flange 47 is formed to include a fourth slot 51 as shown in FIG. 5. The fourth slot 51 extends into the fifth flange 47 axially forward and radially outward to receive a portion of the first strip seal 44 therein. The first slot 60 and the fourth slot 51 are aligned with one another while the first shroud segment 26 and the second shroud segment 28 are assembled adjacent one another.

The second carrier segment 38 further includes a seventh flange 53 and an eighth flange 55 as shown in FIG. 5. Each of the seventh flange 53 and the eighth flange 55 extend radially inward from the second outer wall 45. The seventh flange 53 is located axially between the fifth flange 47 and the eighth flange 55. The eighth flange 55 is located axially between the seventh flange 53 and the sixth flange 49. The seventh and eighth flanges 53, 55 may be inner flanges or clevises that are both located axially inward of the fifth flange 47 and the sixth flange 49.

The seventh flange 53 of the second carrier segment 38 is formed to include a fifth slot 57 as shown in FIG. 7. The fifth slot 57 extends radially outward into the seventh flange 53. The eighth flange 55 of the second carrier segment 38 is formed to include a sixth slot 59 as shown in FIG. 5. The sixth slot 59 extends radially outward into the eighth flange 55. The second slot 68 of the first carrier segment 32 and the fifth slot 57 of the second carrier segment 38 are aligned with one another while the first shroud segment 26 and the second shroud segment 28 are assembled adjacent to one another to receive a portion of the damping segment 48 therein. The third slot 70 of the first carrier segment 32 and the sixth slot 59 of the second carrier segment 38 are aligned with one another while the first shroud segment 26 and the second shroud segment 28 are assembled adjacent to one another to receive another portion of the damping segment 48 therein. Each of the flanges 47, 49, 53, and 55 of the second carrier segment 38 is formed to include a hole that receives the second retainer 42 therein.

The second blade track segment 40 includes a second shroud wall 61 and a second attachment feature 63 that extends radially outward from the second shroud wall 61 as shown in FIG. 5. The second shroud wall 61 has a second radial outer surface 65 that faces toward the second carrier segment 38 and a second radial inner surface opposite the second radial outer surface 65 that faces toward the gas path 25. The second shroud wall 61 extends circumferentially partway around the central axis 11. Illustratively, the second attachment feature 63 includes a third attachment flange 63A and a fourth attachment flange 63B axially aft of the third attachment flange 63A. Each of the attachment flanges 63A, 63B is formed to include a hole that receives the second retainer 42 therein. The third attachment flange 63A is located axially between the fifth flange 47 and the seventh flange 53. The fourth attachment flange 63B is located axially between the eighth flange 55 and the sixth flange 49. Illustratively, the second blade track segment 40 is made of ceramic matrix composite materials.

The second radial outer surface 65 of the second shroud wall 61 includes a first portion 65A and a second portion 65B as shown in FIGS. 6 and 7. The second portion 65B is spaced radially outward from the first portion 65A. The first portion 65A defines a circumferential end 40B of the second shroud wall 61 that confronts the first blade track segment 34 as shown in FIG. 6. The second portion 65B extends circumferentially away from the first portion 65A. The circumferential end 40B is formed with a second pocket 69 that defines the first portion 65A of the second radial outer surface 65 as shown in FIGS. 6 and 7. The second shroud wall 61 slopes radially inwardly at the circumferential end 40B to define the first portion 65A of the second radial outer surface 65. The first and second portions 65A, 65B of the second radial outer surface 65 are exposed to air located radially between the second carrier segment 38 and the second blade track segment 40. The first strip seal 44 of the plurality of seals 30 is located on the first portion 65A of the second radial outer surface 65 as shown in FIG. 6.

The circumferential end 40B is formed to include a second recess 67 extending circumferentially into the second shroud wall 61 to receive the second strip seal 46 therein as shown in FIG. 6. The second recess 67 of the second shroud wall 61 includes a first radially-extending portion 67A that extends radially inward and axially aft and an axially-extending portion 67B that extends axially aft from the first radially-extending portion 67A. In some embodiments, the first radially-extending portion 67A extends radially inward from the first portion 65A of the second radial outer surface 65 of the second shroud wall 61 such that the first radially-extending portion 67A has an open end at the first portion 65A as shown in FIG. 7. The axially-extending portion 67B is radially spaced apart from the first portion 65A of the second radial outer surface 65 of the second shroud wall 61. The second retainer 42 is the same as the first retainer 36 such that description of the first retainer 36 also applies to the second retainer 42.

The plurality of seals 30 includes the first strip seal 44, the second strip seal 46, and the damping segment 48 shown in FIG. 3. The first strip seal 44 extends between the first blade track segment 34 and the second blade track segment 40 to block the gases from passing radially between and beyond the first shroud wall 72 and the second shroud wall 61 as shown in FIGS. 6 and 7. The second strip seal 46 is located radially inward of the first strip seal 44 and extends into the first blade track segment 34 and the second blade track segment 40. The damping segment 48 is located radially outward of the first strip seal 44 and extends into the first carrier segment 32 and the second carrier segment 38.

The first strip seal 44 includes a body segment 84, a forward segment 86, and an aft segment 88 as shown in FIGS. 3 and 5. The body segment 84 extends axially along the first portion 76A of the first radial outer surface 76 of the first shroud wall 72 and the first portion 65A of the second radial outer surface 65 of the second shroud wall 61 between a first end 84A and a second end 84B thereof opposite the first end 84A. The forward segment 86 is coupled to the first end 84A of the body segment 84 and extends axially forward and radially outward from the first end 84A of the body segment 84 into the first slot 60 formed in the first flange 52 of the first carrier segment 32 and the fourth slot 51 formed in the fifth flange 47 of the second carrier segment 38. Illustratively, at least a portion of the forward segment 86 extends along a curvilinear path and at least another portion of the forward segment 86 extends along a straight path. The forward segment 86 extending into the slots 60, 51 retains the body segment 84 axially relative to the first shroud segment 26 so that the body segment 84 does not move fore and aft.

The aft segment 88 of the first strip seal 44 is coupled to the second end 84B of the body segment 84 as shown in FIG. 3. The aft segment 88 extends axially aft and radially outward from the second end 84B of the body segment 84. The aft segment 88 is located axially aft of the second flange 54 of the first carrier segment 32 and the sixth flange 49 of the second carrier segment 38. In some embodiments, the aft segment 88 abuts an aft wall of the second flange 54 and/or an aft wall of the sixth flange 49. In some embodiments, the aft segment 88 abuts a vane 15 as suggested in FIG. 3. Illustratively, at least a portion of the aft segment 88 extends along a curvilinear path and at least another portion of the aft segment 88 extends along a straight path. The engagement of the aft segment 88 with the second flange 54 axially locates the first strip seal 44 relative to the first shroud segment 26.

A radial inner surface of the body segment 84 directly contacts the first portions 76A, 65A of the shroud walls 72, 61 as shown in FIG. 6. A radial outer surface of the body segment 84 is exposed to air that is radially between the carrier segments 32, 38 and the blade track segments 34, 40.

The first pocket 80 of the first blade track segment 34 and the second pocket 69 of the second blade track segment 40 retain the body segment 84 of the first strip seal 44 circumferentially between the first blade track segment 34 and the second blade track segment 40 as suggested in FIGS. 6 and 7. The body segment 84 may move circumferentially a marginal amount, however, the pockets 80, 69 block the body segment 84 from moving such that the circumferential gap G is no longer blocked.

The second strip seal 46 is located radially inward of the first strip seal 44 as shown in FIG. 3. The second strip seal 46 extends circumferentially into each of the first recess 78 of the first blade track segment 34 and the second recess 67 of the second blade track segment 40 to block the circumferential gap G. Because the second strip seal 46 is located radially inward of the first strip seal 44, the second strip seal 46 provides a heat shield for the first strip seal 44 to protect the first strip seal 44 from heat of the gases in the gas path 25.

The second strip seal 46 includes an axial segment 90 and a forward radial segment 92 as shown in FIG. 3. The axial segment 90 extends axially between a first end 90A and a second end 90B thereof opposite the first end 90A. The forward radial segment 92 is coupled with the first end 90A of the axial segment 90 to extend axially forward and radially outward from the first end 90A of the axial segment 90 toward the first strip seal 44. Illustratively, the forward radial segment 92 and the axial segment 90 both extend along straight paths, and an obtuse angle is formed between the forward radial segment 92 and the axial segment 90. The second end 90B of the axial segment 90 terminates in an axial direction.

The axial segment 90 of the second strip seal 46 is located in the axially-extending portions 78B, 67B of the recesses 78, 67 as shown in FIGS. 3 and 6. The forward radial segment 92 is located in the first radially-extending portions 78A, 67A of the recesses 78, 67 as shown in FIG. 7.

The forward radial segment 92 of the second strip seal 46, the first strip seal 44, and the axial segment 90 of the second strip seal 46 cooperate to form a cavity 94 radially between the first strip seal 44 and the second strip seal 46 as shown in FIGS. 3 and 6. The cavity 94 is formed to include an at least partially closed axial forward end 94A defined by the forward radial segment 92 of the second strip seal 46 and an open axial aft end 94B. The open axial aft end 94B of the cavity 94 is unobstructed such that the gases from the gas path 25 are free to flow into the cavity 94 through the open axial aft end 94B thereof.

As shown in FIG. 3, the gases in the gas path 25 near the axial forward end 34A of the first blade track segment 34 have a first pressure P1 and the gases near an axial aft end 34C of the first blade track segment 34 have a second pressure P2 that is less than the first pressure P1 caused by work being extracted from the gases by the blades 21. Gases radially outward of the first strip seal 44 have a third pressure P3 that is greater than the first pressure P1 and the second pressure P2. In the illustrative embodiment, the third pressure P3 is provided by compressor air (for example, compressor discharge air) that is conducted into the shroud segment 26. The third pressure P3 urges the first strip seal 44 radially inward. Due to the open axial aft end 94B of the cavity 94, gases from the gas path 25 may flow into the cavity 94 through the open axial aft end 94B. Gases from the shroud segment 26 at the third pressure P3 may leak into the cavity 94 between the first strip seal 44 and the second strip seal 46. The gases in the cavity 94 have a fourth pressure P4. The fourth pressure P4 is greater than the second pressure P2 and less than the first pressure P1 and the third pressure P3.

Due to the third pressure P3 of the gases radially outward of the first strip seal 44 being greater than the fourth pressure P4 of the gases in the cavity 94, the first strip seal 44 is forced radially inwardly against the blade track segments 34, 40. The second strip seal 46, thus, reduces a pressure load applied to the first strip seal 44 from the gases in the gas path 25 (as compared to direct exposure to the first pressure P1). As an example, without the second strip seal 46, the gases in the gas path 25 may force the first strip seal 44 radially outward such that the first strip seal 44 does not engage each of the blade track segments 34, 40. The first pressure P1 of the gases near the axial forward end 34A of the first blade track segment 34 force the second strip seal 46 radially outwardly within the recesses 78, 67 such that the axial segment 90 of the second strip seal 46 engages radially inwardly facing surfaces of the recesses 78, 67 as shown in FIG. 6.

In some embodiments, because the first strip seal 44 is forced radially inwardly due to the pressure differential between the third pressure P3 and the fourth pressure P4, the damping segment 48 is omitted as shown in FIG. 8. In some embodiments, the damping segment 48 is included in the plurality of seals 30 as shown in FIG. 3. The damping segment 48 extends along a curvilinear path as shown in FIG. 3. In the illustrative embodiment, the curvilinear path forms a w-shape. The damping segment 48 is defined by a first radially-extending portion 96, a second radially-extending portion 98, and a curved intermediate portion 99 that extends between and interconnects the first radially-extending portion 96 and the second radially-extending portion 98. The first radially-extending portion 96 forms the forward-most end of the damping segment 48, and the second radially-extending portion 98 forms the aft-most end of the damping segment 48.

The curved intermediate portion 99 extends between a forward end 99A and an aft end 99B thereof. The first radially-extending portion 96 extends axially forward and radially outward from the forward end 99A of the curved intermediate portion 99 and into the second slot 68 formed in the third flange 56 of the first carrier segment 32 as shown in FIG. 3. The first radially-extending portion 96 extends into both of the second slot 68 of the first carrier segment 32 and the fifth slot 57 of the second carrier segment 38. The second radially-extending portion 98 extends axially aft and radially outward from the aft end 99B of the curved intermediate portion 99 and into the third slot 70 formed in the fourth flange 58 of the first carrier segment 32 and the sixth slot 59 of the second carrier segment 38. The curved intermediate portion 99, from the forward end 99A thereof, extends radially outward and axially aft to a peak 99C as shown in FIG. 3. From the peak 99C, the curved intermediate portion 99 extends radially inward and axially aft to the aft end 99B thereof. The peak 99C is located axially between the third flange 56 and the fourth flange 58. The forward end 99A and the aft end 99B of the curved intermediate portion 99 each engage a radial outer surface of the body segment 84 of the first strip seal 44 as shown in FIG. 3. In some embodiments, the damping segment 48 is formed as a coil. In some embodiments, the damping segment 48 is u-shaped.

The engagement between the first radially-extending portion 96 and the second slot 68 and the second radially-extending portion 98 and the third slot 70 applies a force to the body segment 84 of the first strip seal 44. The force urges the body segment 84 of the first strip seal 44 radially inward against the first and second portions 76A, 65A of the shroud walls 72, 61.

Figure 9:
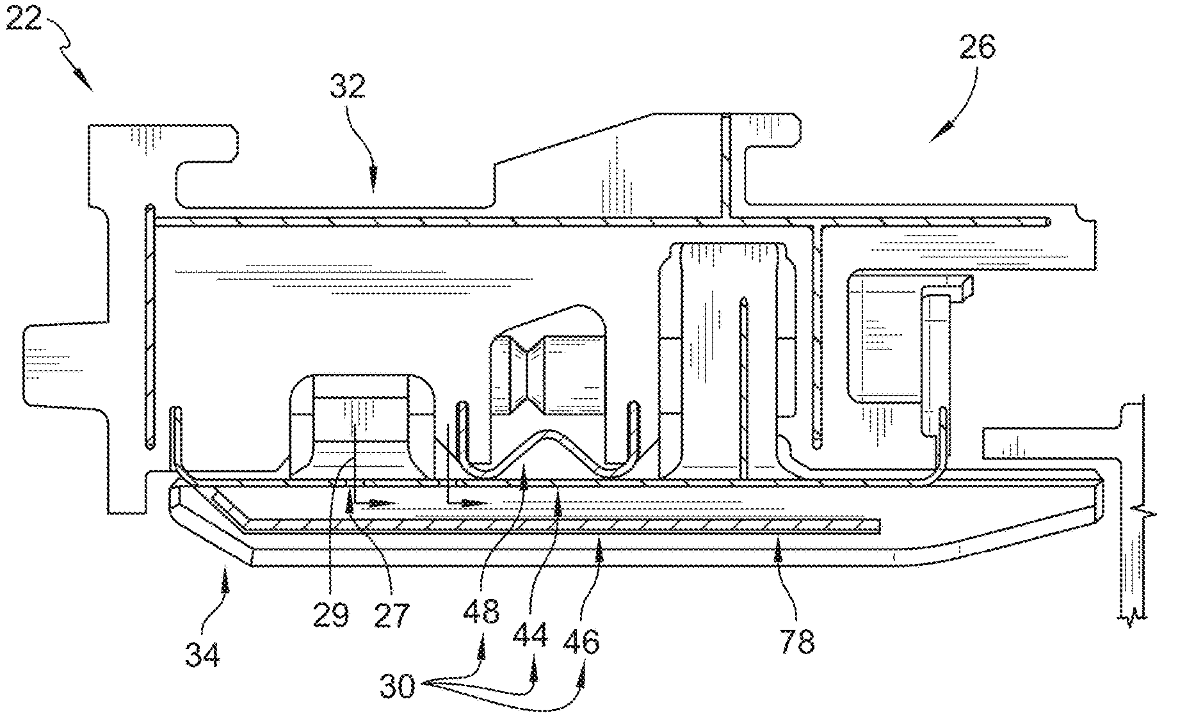
FIG. 9 is a cross-sectional view of the turbine shroud assembly through the plurality of seals of FIG. 3 showing that the first strip seal is formed to include at least one hole extending radially therethrough and configured to direct cool air radially inwardly through the at least one hole toward the second strip seal to cool the second strip seal.
Figure 10:
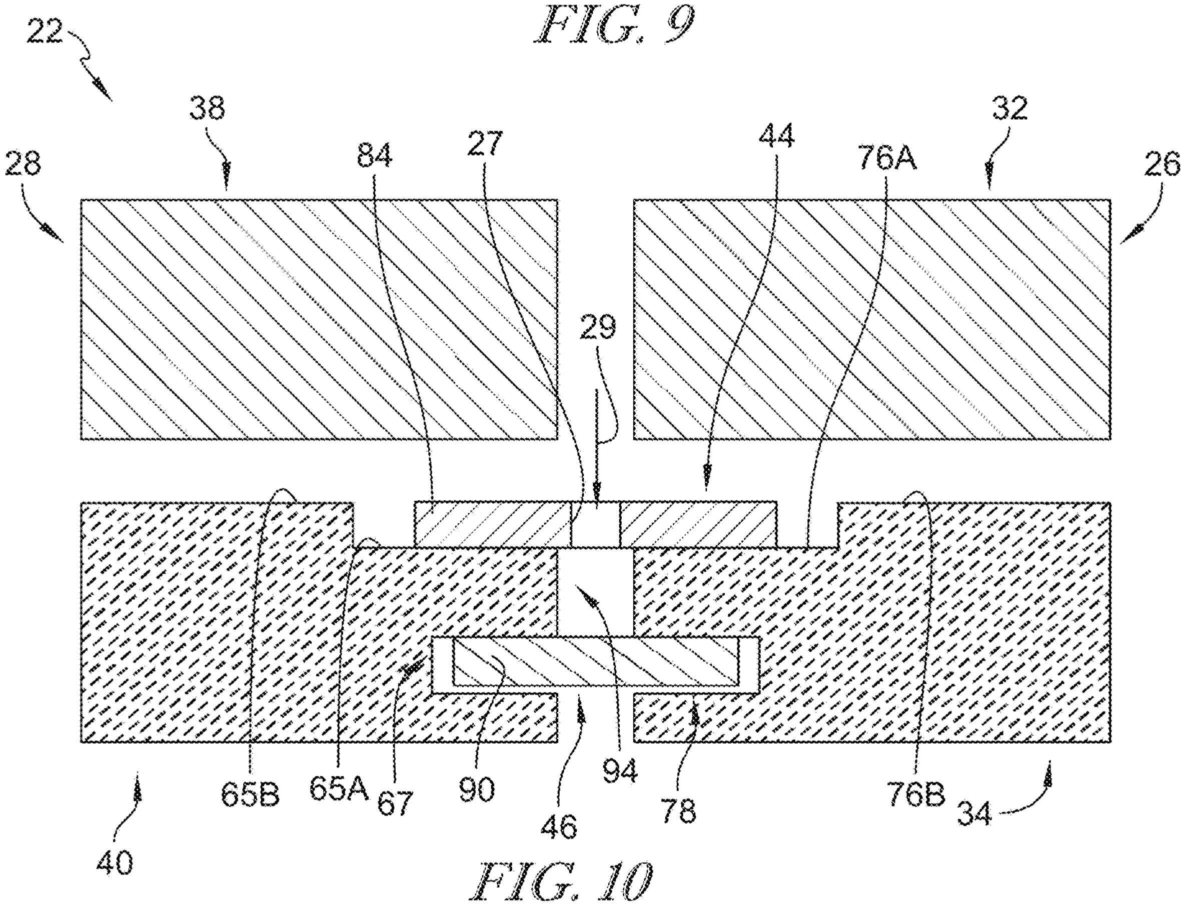
FIG. 10 is a cross-sectional diagrammatic view through the first and second shroud segments as assembled in the turbine shroud assembly of FIG. 9 showing that the first shroud segment and the second shroud segment are assembled adjacent one another and the first strip seal and the second strip seal each extend circumferentially between the first shroud segment and the second shroud segment, and further showing that the first strip seal is formed to include the at least one hole extending radially therethrough to direct cool air toward the second strip seal.

In some embodiments, the body segment 84 of the first strip seal 44 is formed to include at least one hole 27 as shown in FIG. 10 and as suggested in FIG. 9. The at least one hole 27 extends radially through the body segment 84 of the first strip seal 44 to direct cooling air 29 radially inwardly through the at least one hole 27 toward the second strip seal 46 to cool the second strip seal 46. In some embodiments, the body segment 84 is formed to include a plurality of holes 27 that are axially spaced apart from one another.

In some embodiments, the turbine shroud assembly 22 further includes strip seals 102, 104, 106, 108, 110 as shown in FIGS. 3 and 5. Each of the strip seals 102, 104, 106, 108 extends into the first carrier segment 32 and the second carrier segment 38. The strip seal 110 extends into each of the second attachment flange 74B of the first blade track segment 34 and the fourth attachment flange 63B of the second blade track segment 40. The first carrier segment 32 and the second carrier segment 38 are each formed to include grooves sized to receive the strip seals 102, 104, 106, 108 therein as shown in FIGS. 3 and 5. The second attachment flange 74B of the first blade track segment 34 and the fourth attachment flange 63B of the second blade track segment 40 are each formed to include a groove sized to receive the strip seal 110 therein. The strip seals 102, 104, 106, 108, 110 provide additional sealing between the first shroud segment 26 and the second shroud segment 28.

Figure 11:
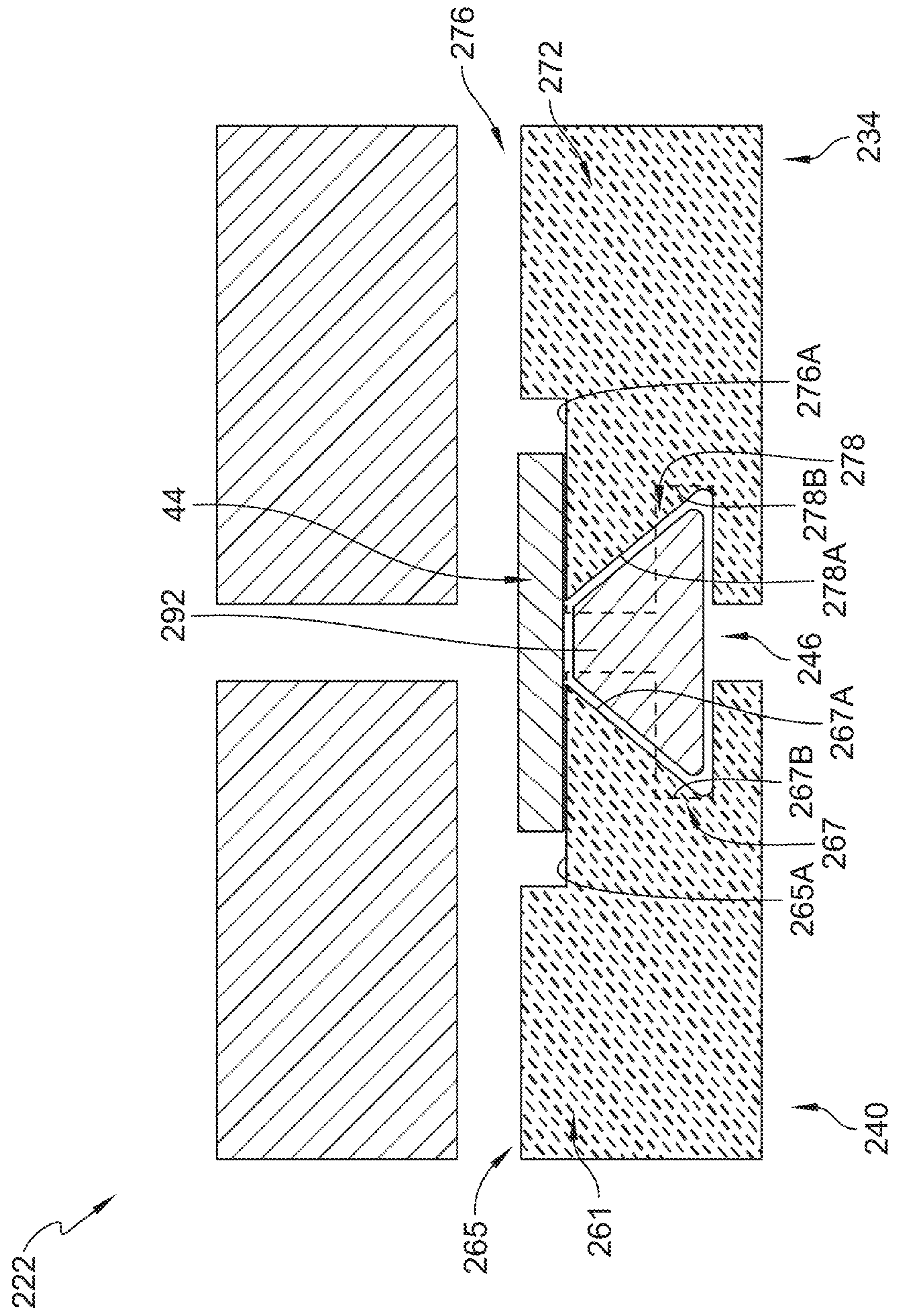
FIG. 11 is a cross-sectional diagrammatic view of another embodiment of a turbine shroud assembly for use in the gas turbine engine of FIG. 1 showing that a first shroud wall of a first blade track segment is formed to include a first recess and a second shroud wall of a second blade track segment is formed to include a second recess, and a first radially-extending portion of the first recess and a first radially-extending portion of the second recess are tapered toward one another, and further showing that a second strip seal includes a forward radial segment that extends radially outward toward the first strip seal and is tapered to match a shape of the first and second recesses.

Another embodiment of a turbine shroud assembly 222 in accordance with the present disclosure is shown in FIG. 11. The turbine shroud assembly 222 is substantially similar to the turbine shroud assembly 22 shown in FIGS. 1-10 and described herein. Accordingly, similar reference numbers in the 200 series indicate features that are common between the turbine shroud assembly 22 and the turbine shroud assembly 222. The description of the turbine shroud assembly 22 is incorporated by reference to apply to the turbine shroud assembly 222, except in instances when it conflicts with the specific description and the drawings of the turbine shroud assembly 222.

As compared to the turbine shroud assembly 22, the turbine shroud assembly 222 includes different shaped recesses 278, 267 formed in the blade track segments 234, 240 and a different shaped second strip seal 246. The first recess 278 extends circumferentially into a first shroud wall 272 of the first blade track segment 234 to receive the second strip seal 246 therein as shown in FIG. 11. The first recess 278 includes a first radially-extending portion 278A that extends radially inward and axially aft and an axially-extending portion 278B that extends axially aft from the first radially-extending portion 278A. In some embodiments, the first radially-extending portion 278A extends radially inward from a first portion 276A of a first radial outer surface 276 of the first shroud wall 272.

A width of the axially-extending portion 278B of the first recess 278 remains constant throughout the axially-extending portion 278B. A width of the first radially-extending portion 278A decreases as the first radially-extending portion 278A extends radially outwardly from the axially-extending portion 278B as shown in FIG. 11. In other words, the first radially-extending portion 278A is tapered as the first radially-extending portion 278A extends radially outwardly from the axially-extending portion 278B.

The second recess 267 extends circumferentially into a second shroud wall 261 of the second blade track segment 240 to receive the second strip seal 246 therein as shown in FIG. 11. The second recess 267 includes a first radially-extending portion 267A that extends radially inward and axially aft and an axially-extending portion 267B that extends axially aft from the first radially-extending portion 267A. In some embodiments, the first radially-extending portion 267A extends radially inward from a first portion 265A of a second radial outer surface 265 of the second shroud wall 261.

A width of the axially-extending portion 267B of the second recess 267 remains constant throughout the axially-extending portion 278B. A width of the first radially-extending portion 267A decreases as the first radially-extending portion 267A extends radially outwardly from the axially-extending portion 267B as shown in FIG. 11. In other words, the first radially-extending portion 267A is tapered as the first radially-extending portion 267A extends radially outwardly from the axially-extending portion 267B.

As compared to the second strip seal 46, the second strip seal 246 has a different shaped forward radial segment 292 as shown in FIG. 11. An axial segment of the second strip seal 246 has a constant width throughout the axial segment. The forward radial segment 292 extends axially forward and radially outward from the axial segment toward the first strip seal 44. A width of the forward radial segment 292 decreases as the forward radial segment 292 extends radially outwardly from the axial segment as shown in FIG. 11. In other words, the forward radial segment 292 is tapered as the forward radial segment 292 extends radially outwardly. The tapered recesses 278, 267 and the tapered forward radial segment 292 reduce leakage from the gas path 25 radially outward through the recesses 278, 267.

Figure 12:
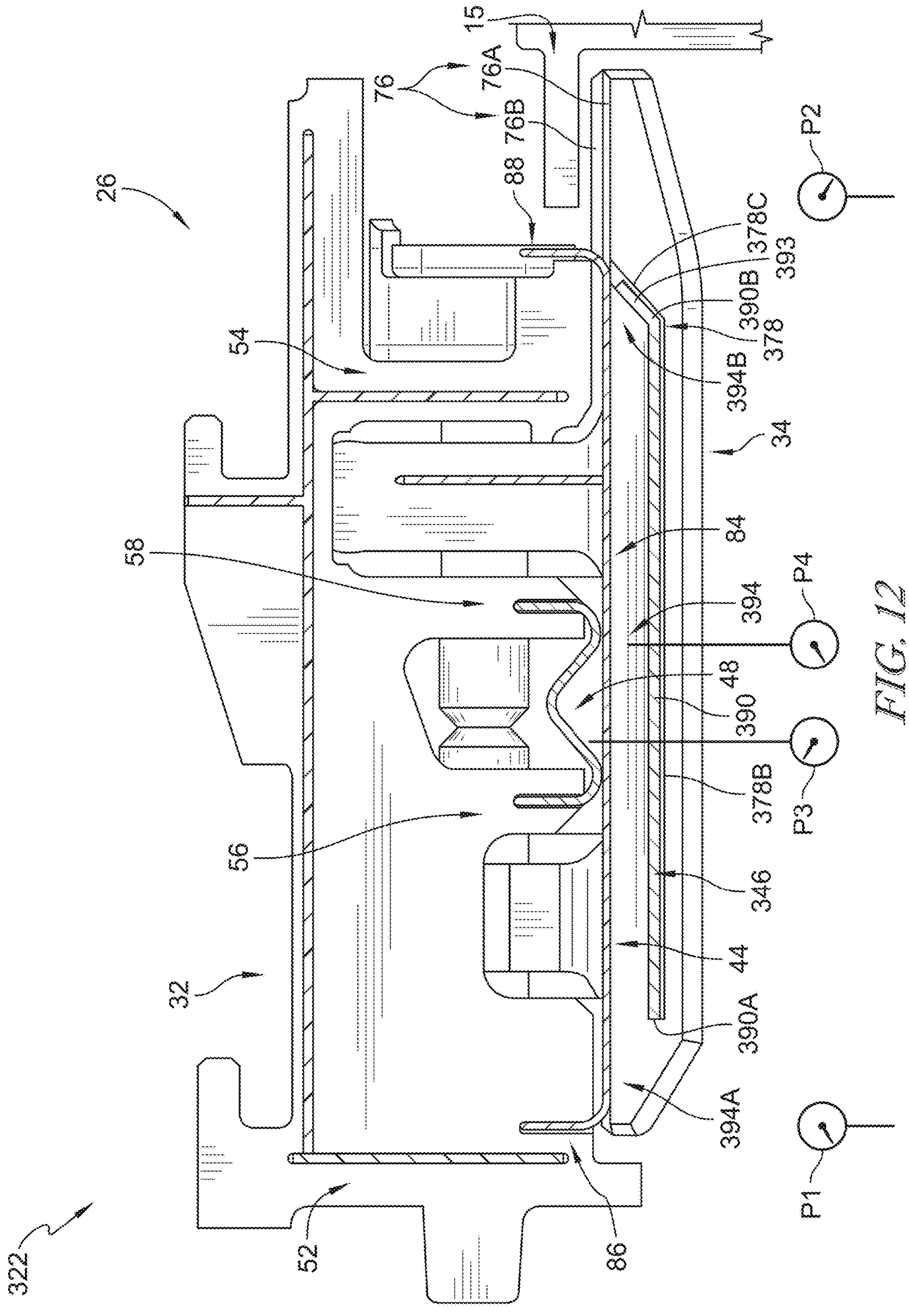
FIG. 12 is a cross-sectional view of a turbine shroud assembly for use in the gas turbine engine of FIG. 1 showing an alternative embodiment of a second strip seal, the second strip seal including an axial segment that extends axially between a first end and a second end thereof and an aft radial segment coupled with the second end of the axial segment to extend radially outward and axially aft toward the first strip seal.

Another embodiment of a turbine shroud assembly 322 in accordance with the present disclosure is shown in FIG. 12. The turbine shroud assembly 322 is substantially similar to the turbine shroud assembly 22 shown in FIGS. 1-10 and described herein. Accordingly, similar reference numbers in the 300 series indicate features that are common between the turbine shroud assembly 22 and the turbine shroud assembly 322. The description of the turbine shroud assembly 22 is incorporated by reference to apply to the turbine shroud assembly 322, except in instances when it conflicts with the specific description and the drawings of the turbine shroud assembly 322.

As compared to the turbine shroud assembly 22, the turbine shroud assembly 322 includes a different second strip seal 346 and a different recess 378. The second strip seal 346 includes an axial segment 390 and an aft radial segment 393 as shown in FIG. 12. The axial segment 390 extends axially between a first end 390A and a second end 390B thereof opposite the first end 390A. The aft radial segment 393 is coupled with the second end 390B of the axial segment 390 to extend axially aft and radially outward from the second end 390B of the axial segment 390 toward the first strip seal 44. Illustratively, the aft radial segment 393 and the axial segment 390 both extend along straight paths, and an obtuse angle is formed between the aft radial segment 393 and the axial segment 390.

The first recess 378 of the first shroud wall 72 includes an axially-extending portion 378B that extends axially aft and a second radially-extending portion 378C that extends radially outward and axially aft from the axially-extending portion 378B as shown in FIG. 12. In some embodiments, the second radially-extending portion 378C extends radially outward to the first portion 76A of the first radial outer surface 76 of the first shroud wall 72 such that the second radially-extending portion 378C has an open end at the first portion 76A. The axially-extending portion 378B is radially spaced apart from the first portion 76A of the first radial outer surface 76 of the first shroud wall 72. The second recess of the second shroud wall of the second blade track segment is shaped the same as the first recess 378.

The aft radial segment 393 is located in the second radially-extending portions 378C of the recesses 78 as shown in FIG. 12. The first end 390A of the axial segment 390 terminates in an axial direction. In some embodiments, the aft radial segment 393 of the second strip seal 346 and the second radially-extending portions 378C of the recesses 378 may be tapered as described in relation to FIG. 11.

The aft radial segment 393 of the second strip seal 346, the first strip seal 44, and the axial segment 390 of the second strip seal 346 cooperate to form a cavity 394 radially between the first strip seal 44 and the second strip seal 346 as shown in FIG. 12. The cavity 394 is formed to include an open axial forward end 394A and an at least partially closed axial aft end 394B defined by the aft radial segment 393 of the second strip seal 346.

Figure 13:
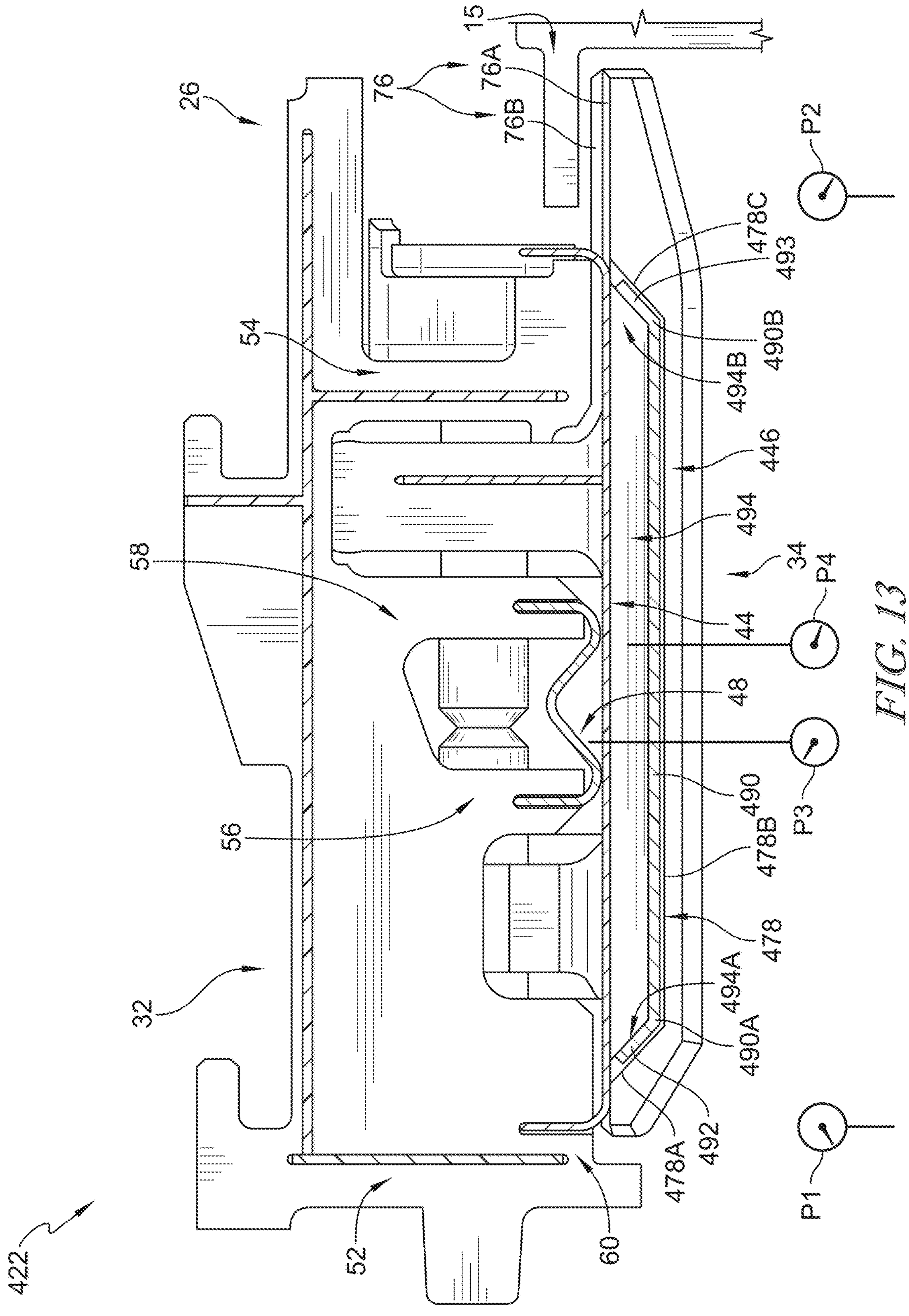
FIG. 13 is a cross-sectional view of a turbine shroud assembly for use in the gas turbine engine of FIG. 1 showing an alternative embodiment of a second strip seal, the second strip seal including an axial segment that extends axially between a first end and a second end thereof, a forward radial segment coupled with the first end of the axial segment to extend radially outward and axially forward toward the first strip seal and an aft radial segment coupled with the second end of the axial segment to extend radially outwardly and axially aft toward the first strip seal.

Another embodiment of a turbine shroud assembly 422 in accordance with the present disclosure is shown in FIG. 13. The turbine shroud assembly 422 is substantially similar to the turbine shroud assembly 22 shown in FIGS. 1-10 and described herein. Accordingly, similar reference numbers in the 400 series indicate features that are common between the turbine shroud assembly 22 and the turbine shroud assembly 422. The description of the turbine shroud assembly 22 is incorporated by reference to apply to the turbine shroud assembly 422, except in instances when it conflicts with the specific description and the drawings of the turbine shroud assembly 422.

As compared to the turbine shroud assembly 22, the turbine shroud assembly 422 includes a different second strip seal 446 and a different recess 478. The second strip seal 446 includes an axial segment 490, a forward radial segment 492, and an aft radial segment 493 as shown in FIG. 13. The axial segment 490 extends axially between a first end 490A and a second end 490B thereof opposite the first end 490A.

The forward radial segment 492 is coupled with the first end 490A of the axial segment 490 to extend axially forward and radially outward from the first end 490A of the axial segment 490 toward the first strip seal 44. Illustratively, the forward radial segment 492 and the axial segment 490 both extend along straight paths, and an obtuse angle is formed between the forward radial segment 492 and the axial segment 490.

The first recess 478 of the first shroud wall 72 includes a first radially-extending portion 478A that extends radially inward and axially aft, an axially-extending portion 478B that extends axially aft from the first radially-extending portion 478A, and a second radially-extending portion 478C that extends radially outward and axially aft from the axially-extending portion 478B as shown in FIG. 13. In some embodiments, the first radially-extending portion 478A extends radially inward from the first portion 76A of the first radial outer surface 76 of the first shroud wall 72 such that the first radially-extending portion 478A has an open end at the first portion 76A. In some embodiments, the second radially-extending portion 478C extends radially outward to the first portion 76A of the first radial outer surface 76 of the first shroud wall 72 such that the second radially-extending portion 478C has an open end at the first portion 76A. The axially-extending portion 478B extends between and interconnects the first radially-extending portion 478A and the second radially-extending portion 478C. The axially-extending portion 478B is radially spaced apart from the first portion 76A of the first radial outer surface 76 of the first shroud wall 72. The second recess of the second shroud wall of the second blade track segment is shaped the same as the first recess 478.

The forward radial segment 492 is located in the first radially-extending portions 478A of the recesses 478 as shown in FIG. 13. The aft radial segment 493 is coupled with the second end 490B of the axial segment 490 to extend axially aft and radially outward from the second end 490B of the axial segment 490 toward the first strip seal 44. Illustratively, the aft radial segment 493 and the axial segment 490 both extend along straight paths, and an obtuse angle is formed between the aft radial segment 493 and the axial segment 490. The aft radial segment 493 is located in the second radially-extending portions 478C of the recesses 478 as shown in FIG. 13. In some embodiments, the forward radial segment 492, the aft radial segment 493, the first radially-extending portions 478A of the recesses 78, and the second radially-extending portions 478C of the recesses 78 may be tapered as described in relation to FIG. 11.

The aft radial segment 493 of the second strip seal 446, the first strip seal 44, the forward radial segment 492 of the second strip seal 446, and the axial segment 490 of the second strip seal 446 cooperate to form a cavity 494 radially between the first strip seal 44 and the second strip seal 446 as shown in FIG. 13. The cavity 494 is formed to include an at least partially closed axial forward end 494A defined by the forward radial segment 492 of the second strip seal 446 and an at least partially closed axial aft end 494B defined by the aft radial segment 493 of the second strip seal 446.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine shroud assembly for use with a gas turbine engine, the turbine shroud assembly comprising:

a first shroud segment including a first carrier segment arranged circumferentially at least partway around a central axis and a first blade track segment supported by the first carrier segment to define a first portion of a gas path of the turbine shroud assembly, the first blade track segment having a first shroud wall that extends circumferentially partway around the central axis, a first attachment flange that extends radially outward from the first shroud wall, and a second attachment flange that extends radially outward from the first shroud wall axially spaced apart from the first attachment flange, wherein the first shroud wall has a first radial outer surface and a first radial inner surface, the first radial outer surface includes a first portion and a second portion that extends circumferentially away from the first portion and is spaced radially outward from the first portion, and the first shroud wall is formed to include a first recess that extends circumferentially into the first shroud wall, a second shroud segment arranged circumferentially adjacent the first shroud segment about the central axis, the second shroud segment including a second carrier segment arranged circumferentially at least partway around the central axis and a second blade track segment supported by the second carrier segment to define a second portion of the gas path of the turbine shroud assembly, the second blade track segment having a second shroud wall that extends circumferentially partway around the central axis, a first attachment flange that extends radially outward from the second shroud wall, and a second attachment flange that extends radially outward from the second shroud wall axially spaced apart from the first attachment flange of the second blade track segment, wherein the second shroud wall has a second radial outer surface and a second radial inner surface, the second radial outer surface includes a first portion and a second portion that extends circumferentially away from the first portion of the second radial outer surface and is spaced radially outward from the first portion of the second radial outer surface, and the second shroud wall is formed to include a second recess that extends circumferentially into the second shroud wall, and a plurality of seals extending circumferentially into the first shroud segment and the second shroud segment to block gases from escaping the gas path radially between the first shroud segment and the second shroud segment, the plurality of seals including a first strip seal and a second strip seal, the first strip seal extends axially along the first portion of the first radial outer surface of the first shroud wall and the first portion of the second radial outer surface of the second shroud wall to block the gases from passing radially between and beyond the first shroud wall and the second shroud wall, and the second strip seal is located radially inward of the first strip seal and extends circumferentially into the first recess formed in the first shroud wall of the first blade track segment and the second recess formed in the second shroud wall of the second blade track segment to provide a heat shield for the first strip seal to protect the first strip seal from heat of the gases in the gas path, wherein the second strip seal includes an axial segment that extends axially between a first end and a second end thereof opposite the first end and an aft radial segment coupled with the second end of the axial segment and extending axially aft and radially outward from the second end of the axial segment toward the first strip seal, wherein the first recess is defined by a first radially-outer wall, a first radially-inner wall spaced radially inward from the first radially-outer wall, and a first side wall extending between and interconnecting the first radially-outer wall and the first radially-inner wall, the first radially-outer wall located radially between the first strip seal and the second strip seal.

2. The turbine shroud assembly of claim 1, wherein the first end of the axial segment terminates in an axial direction to cause the aft radial segment and the axial segment to cooperate with the first strip seal to define a cavity radially between the first strip seal and the axial segment of the second strip seal, the cavity having an open axial forward end and an at least partially closed axial aft end defined by the aft radial segment.

3. The turbine shroud assembly of claim 1, wherein the second strip seal includes a forward radial segment coupled with the first end of the axial segment and extending axially forward and radially outward from the first end of the axial segment toward the first strip seal.

4. The turbine shroud assembly of claim 1, wherein the first recess of the first shroud wall includes a first radially-extending portion that extends radially inward and axially aft, an axially-extending portion that extends axially aft from the first radially-extending portion, and a second radially-extending portion that extends radially outward and axially aft from the axially-extending portion.

5. The turbine shroud assembly of claim 4, wherein the first radially-extending portion extends radially inward from the first portion of the first radial outer surface of the first shroud wall, the second radially-extending portion extends radially outward to the first portion of the first radial outer surface of the first shroud wall, and the axially-extending portion is radially spaced apart from the first portion of the first radial outer surface of the first shroud wall.

6. The turbine shroud assembly of claim 1, wherein the first carrier segment includes a first outer wall, a first flange that extends radially inward from the first outer wall, a second flange axially spaced apart from the first flange and extending radially inward from the first outer wall, a third flange that extends radially inward from the first outer wall and is located axially between the first flange and the second flange, and a fourth flange that extends radially inward from the first outer wall and is located axially between the third flange and the second flange, and wherein the first strip seal includes a body segment that extends axially along the first portion of the first radial outer surface of the first shroud wall and the first portion of the second radial outer surface of the second shroud wall, a forward segment coupled to a first end of the body segment and extending axially forward and radially outward from the first end of the body segment into the first flange of the first carrier segment, and an aft segment coupled to a second end of the body segment opposite the first end thereof and extending axially aft and radially outward from the second end of the body segment, and wherein the aft segment is located axially aft of the second flange of the first carrier segment.

7. The turbine shroud assembly of claim 6, wherein the plurality of seals includes a damping segment that extends along a curvilinear path and is located radially outward of the first strip seal and axially between the first flange and the second flange of the first carrier segment.

8. The turbine shroud assembly of claim 7, wherein the damping segment is formed to include a first radially-extending portion at a forward end of the damping segment that extends into the third flange of the first carrier segment and a second radially-extending portion at an aft end of the damping segment that extends into the fourth flange of the first carrier segment.

9. The turbine shroud assembly of claim 8, wherein the damping segment is w-shaped and includes a curved intermediate portion that extends between and interconnects the first radially-extending portion and the second radially-extending portion, and wherein the curved intermediate portion engages the first strip seal to urge the first strip seal radially inwardly against the first portion of the first radial outer surface of the first shroud wall and the first portion of the second radial outer surface of the second shroud wall.

10. The turbine shroud assembly of claim 1, wherein the first strip seal is formed to include at least one hole extending radially through the first strip seal to direct cooling air radially inwardly through the at least one hole toward the second strip seal to cool the second strip seal.

11. A turbine shroud assembly for use with a gas turbine engine, the turbine shroud assembly comprising:

a first shroud segment including a first carrier segment arranged circumferentially at least partway around a central axis and a first blade track segment supported by the first carrier segment to define a first portion of a gas path of the turbine shroud assembly, the first blade track segment having a first shroud wall that extends circumferentially partway around the central axis and a first attachment feature that extends radially outward from the first shroud wall, the first shroud wall defining a first radial outer surface, a second shroud segment arranged circumferentially adjacent the first shroud segment about the central axis, the second shroud segment including a second carrier segment arranged circumferentially at least partway around the central axis and a second blade track segment supported by the second carrier segment to define a second portion of the gas path of the turbine shroud assembly, the second blade track segment having a second shroud wall that extends circumferentially partway around the central axis and a second attachment feature that extends radially outward from the second shroud wall, the second shroud wall defining a second radial outer surface, and a plurality of seals extending circumferentially into the first shroud segment and the second shroud segment, the plurality of seals including a first seal and a second seal, the first seal extends axially along the first radial outer surface of the first shroud wall and the second radial outer surface of the second shroud wall, and the second seal is located radially inward of the first seal and extends circumferentially into the first blade track segment and the second blade track segment, wherein the second seal includes an axial segment that extends axially between a first end and a second end thereof opposite the first end and an aft radial segment coupled with the second end of the axial segment and extending axially aft and radially outward from the second end of the axial segment toward the first seal, wherein the first carrier segment includes a first outer wall, a first flange that extends radially inward from the first outer wall, a second flange axially spaced apart from the first flange and extending radially inward from the first outer wall, a third flange that extends radially inward from the first outer wall and is located axially between the first flange and the second flange, and a fourth flange that extends radially inward from the first outer wall and is located axially between the third flange and the second flange, and wherein the first seal includes a body segment that extends axially along the first radial outer surface of the first shroud wall and the second radial outer surface of the second shroud wall, a forward segment coupled to a first end of the body segment and extending axially forward and radially outward from the first end of the body segment into the first flange of the first carrier segment, and an aft segment coupled to a second end of the body segment opposite the first end thereof and extending axially aft and radially outward from the second end of the body segment, and wherein the aft segment is located axially aft of the second flange of the first carrier segment.

12. The turbine shroud assembly of claim 11, wherein the first end of the axial segment terminates in an axial direction to cause the aft radial segment and the axial segment to cooperate with the first seal to define a cavity radially between the first seal and the axial segment of the second seal, the cavity having an open axial forward end and an at least partially closed axial aft end defined by the aft radial segment.

13. The turbine shroud assembly of claim 11, wherein the second seal includes a forward radial segment coupled with the first end of the axial segment and extending axially forward and radially outward from the first end of the axial segment toward the first seal.

14. The turbine shroud assembly of claim 11, wherein the first shroud wall is formed to include a first recess that extends circumferentially into the first shroud wall and the second shroud wall is formed to include a second recess that extends circumferentially into the second shroud wall, and wherein the second seal extends circumferentially into each of the first recess and the second recess to extend therebetween.

15. The turbine shroud assembly of claim 14, wherein the first recess of the first shroud wall includes an axially-extending portion that extends axially aft and a radially-extending portion that extends radially outward and axially aft from the axially-extending portion.

16. The turbine shroud assembly of claim 11, wherein the plurality of seals includes a damping segment that extends along a curvilinear path and is located radially outward of the first seal, the damping segment is formed to include a first radially-extending portion at a forward end of the damping segment that extends into the third flange of the first carrier segment, a second radially-extending portion at an aft end of the damping segment that extends into the fourth flange of the first carrier segment, and a curved intermediate portion that extends between and interconnects the first radially-extending portion and the second radially-extending portion, and wherein the curved intermediate portion engages the first seal to urge the first seal radially inwardly against the first radial outer surface of the first shroud wall and the second radial outer surface of the second shroud wall.

17. A method of assembling a turbine shroud assembly for use with a gas turbine engine comprising:

assembling a first shroud segment by coupling a first blade track segment with a first carrier segment to support the first blade track segment radially inward of the first carrier segment, assembling a second shroud segment by coupling a second blade track segment with a second carrier segment to support the second blade track segment radially inward of the second carrier segment, locating a first seal on a first radial outer surface of the first blade track segment, locating a second seal in a first recess that extends circumferentially into the first blade track segment so that the second seal is located radially inwardly of the first seal, and locating a damping segment on a radially outer surface of the first seal so that the damping segment engages the first seal and the first carrier segment.

18. The method of claim 17, wherein the first carrier segment includes a first outer wall, a first flange that extends radially inward from the first outer wall, a second flange axially spaced apart from the first flange and extending radially inward from the first outer wall, a third flange that extends radially inward from the first outer wall and is located axially between the first flange and the second flange, and a fourth flange that extends radially inward from the first outer wall and is located axially between the third flange and the second flange, and wherein the method further comprises locating a first portion of the damping segment in the third flange of the first carrier segment and a second portion of the damping segment in the fourth flange of the first carrier segment and urging the first seal radially inwardly against the first radial outer surface of the first blade track segment through engagement of the damping segment with the third flange and the fourth flange.

19. The method of claim 17, further comprising directing cool air radially inwardly through at least one hole formed in the first seal toward the second seal to cool the second seal.

20. The turbine shroud assembly of claim 1, wherein the first strip seal includes a body segment that extends axially along the first portion of the first radial outer surface of the first shroud wall and the first portion of the second radial outer surface of the second shroud wall, a forward segment coupled to a first end of the body segment and extending axially forward and radially outward from the first end of the body segment into the first carrier segment, and an aft segment coupled to a second end of the body segment opposite the first end thereof and extending axially aft and radially outward from the second end of the body segment.

* * * * *